US012719641B2

(12) United States Patent
Axmon et al.

(10) Patent No.: US 12,719,641 B2
(45) Date of Patent: Aug. 25, 2026

(54) METHOD OF CONFIGURING FIRST AND SECOND SETS OF ACTIVE TRANSCEIVERS, A COMPUTER PROGRAM PRODUCT, A PROCESSING UNIT, AND WIRELESS DEVICES THEREFOR

(71) Applicant: BEAMMWAVE AB, Lund (SE)

(72) Inventors: Joakim Axmon, Limhamn (SE); Bengt Lindoff, Bjärred (SE)

(73) Assignee: BEAMMWAVE AB, Lund (SE)

(*) Notice: Subject to any disclaimer, the term of this patent is extended or adjusted under 35 U.S.C. 154(b) by 265 days.

(21) Appl. No.: 18/720,553

(22) PCT Filed: Jan. 24, 2023

(86) PCT No.: PCT/SE2023/050059
§ 371 (c)(1),
(2) Date: Jun. 14, 2024

(87) PCT Pub. No.: WO2023/146454
PCT Pub. Date: Aug. 3, 2023

(65) Prior Publication Data

US 2024/0413950 A1 Dec. 12, 2024

(30) Foreign Application Priority Data

Jan. 31, 2022 (SE) .................................... 2230029-7

(51) Int. Cl.
*H04W 72/23* (2023.01)
*H04B 7/04* (2017.01)
(Continued)

(52) U.S. Cl.
CPC .......... *H04L 5/0053* (2013.01); *H04L 5/0096* (2013.01); *H04W 52/0216* (2013.01)

(58) Field of Classification Search
CPC . H04L 5/0053; H04L 5/0096; H04W 52/0216
See application file for complete search history.

(56) References Cited

U.S. PATENT DOCUMENTS

2021/0328641 A1 10/2021 Xu et al.
2021/0410145 A1 12/2021 Khoshnevisan et al.
2023/0144547 A1* 5/2023 Bhamri .............. H04B 7/06952 370/330

FOREIGN PATENT DOCUMENTS

WO WO-2021163996 A1 8/2021
WO WO-2021197474 A1 10/2021
WO WO-2021198933 A1 10/2021

OTHER PUBLICATIONS

CMCC, R2-1913171, 'Consideration on MAC CE design for single PDCCH based multi-TRP transmission', 3GPP TSG-RAN WG2 Meeting #107Bis, Oct. 14-18, 2019, pp. 1-6. (Year: 2019).*

(Continued)

*Primary Examiner* — Melvin C Marcelo
(74) *Attorney, Agent, or Firm* — MARSHALL, GERSTEIN & BORUN LLP

(57) ABSTRACT

A method for a processing unit, the processing unit being comprisable in a wireless device, WD, and being connectable to a plurality of transceivers, the method comprising: obtaining a first active Transmission Configuration Indicator, TCI, state for a first network, NW, node; obtaining a second active TCI state for a second NW, node; selecting a first set of active transceivers from the plurality of transceivers based on the first active TCI state; selecting a second set of active transceivers from the plurality of transceivers based on the second active TCI state; configuring the first set of active transceivers to receive, at a first time instant, a first physical channel/signal transmitted according to the first active TCI state; and configuring the second set of active transceivers to receive, at a second time instant, a second physical channel/signal transmitted according to the second active TCI state. Corresponding computer program product, processing unit and wireless devices are also disclosed.

20 Claims, 10 Drawing Sheets

(51) Int. Cl.

| | |
|---|---|
| ***H04B 7/08*** | (2006.01) |
| ***H04L 5/00*** | (2006.01) |
| ***H04W 52/02*** | (2009.01) |
| ***H04W 72/04*** | (2023.01) |
| ***H04W 88/06*** | (2009.01) |

(56) References Cited

OTHER PUBLICATIONS

International Search Report and Written Opinion for Application No. PCT/SE2023/050059, dated Feb. 10, 2023.
Swedish Search Report for Application No. 2230029-7, dated Sep. 14, 2022.
Feature lead summary of Enhancements on Multi-beam Operations; LG Electronics; 3GPP TSG RAN WG1 Meeting #98, Prague, CZ, Aug. 26-30, 2019; Sep. 3, 2019; http://www.3gpp.org/ftp/tsg_ran/WG1_RL1/TSGR1_98/Docs/R1-1909695.zip; abstract; p. 8.

* cited by examiner

METHOD OF CONFIGURING FIRST AND SECOND SETS OF ACTIVE TRANSCEIVERS, A COMPUTER PROGRAM PRODUCT, A PROCESSING UNIT, AND WIRELESS DEVICES THEREFOR

CROSS-REFERENCE TO RELATED APPLICATIONS

This present application is the US national phase of International Patent Application No. PCT/SE2023/050059, filed Jan. 24, 2023, which claims priority to Sweden Application No. 2230029-7, filed Jan. 31, 2022. These applications are hereby incorporated by reference in their entireties.

TECHNICAL FIELD

The present disclosure relates to a method for a processing unit to configure first and second sets of active transceivers, a computer program product, a processing unit, and wireless devices therefor.

More specifically, the disclosure relates to a method for a processing unit to configure first and second sets of active transceivers, a computer program product, a processing unit, and wireless devices as defined in the introductory parts of the independent claims.

BACKGROUND ART

Digital beamforming management for a wireless device (WD) comprises at least antenna selection and digital beamforming (BF). Antenna selection relates to updating of a set of active antennas (and transceivers associated with the active antennas) based on measurements on synchronization signal blocks (SSBs) transmitted in SSB bursts at SSB occasions and channel state information reference symbols (CSI-RS) during time periods without SSB reception and the active antenna/transceiver set is thereafter utilized for digital BF on various physical channels. The WD can be configured with a number of base station (gNB) transmission (TX) beams, with corresponding Transmission Configuration Indicator (TCI) states, associated with CSI-RS and/or SSB's to monitor for inter-TX beam management.

A gNB can activate more than one TCI state at a time, an active/activated TCI state being the TCI state of a presently active transmission beam of the gNB (which the WD needs to perform digital BF on). Each TCI state has its own active antenna/transceiver set and the different active antenna/transceiver sets may be non-overlapping. For instance, a physical downlink control channel (PDCCH) may utilize one TCI-state while a physical downlink shared channel (PDSCH) utilizes a different TCI-state. This is activated by Layer-1 (L1) signalling, e.g., via downlink control information (DCI) in PDCCH, and both TCI-states need to be monitored, e.g., to allow for quick changes between different TCI-states.

WO 2021/064200 A1 recognizes that different TCI states may be utilized, but discloses only association between TCI states and transmit antenna ports at the network (NW) side, and is silent regarding which transceivers to use in the WD.

Hence, there may be a need for a management method for maintaining active transceivers (of the WD) for each active TCI state.

SUMMARY

An object of the present disclosure is to mitigate, alleviate or eliminate one or more of the above-identified deficiencies and disadvantages in the prior art and solve at least the above-mentioned problem.

According to a first aspect there is provided a method for a processing unit, the processing unit being comprisable in a wireless device (WD), and the processing unit being connectable to a plurality of transceivers. The method comprises obtaining a first active Transmission Configuration Indicator (TCI) state for a first network, NW, node. Furthermore, the method comprises obtaining a second active TCI state for a second NW, node. Moreover, the method comprises selecting a first set of active transceivers from the plurality of transceivers based on the first active TCI state. The method comprises selecting a second set of active transceivers from the plurality of transceivers based on the second active TCI state. Furthermore, the method comprises configuring the first set of active transceivers to receive, at a first time instant, a first physical channel/signal transmitted according to the first active TCI state. Moreover, the method comprises configuring the second set of active transceivers to receive, at a second time instant, a second physical channel/signal transmitted according to the second active TCI state.

According to some embodiments, the second active TCI state is obtained based on information received via the first physical channel.

According to some embodiments, the first physical channel is a physical downlink control channel, PDCCH, and the second physical channel is a physical downlink shared channel, PDSCH.

According to some embodiments, the first and second physical channels are both PDCCH.

According to some embodiments, the first and second physical channels are PDSCH.

According to some embodiments, one or both of the physical signals are downlink reference signals, such as channel state information reference signals (CSI-RS).

According to some embodiments, the first physical channel is a PDCCH, and the second physical signal is a CSI-RS.

According to some embodiments, configuring the first set of active transceivers comprises activating the first set of (active) transceivers.

According to some embodiments, configuring the second set of (active) transceivers comprises activating the second set of active transceivers.

According to some embodiments, the first and second TCI states are different.

According to some embodiments, the first set of active transceivers comprises at least one transceiver not comprised in the second set of active transceivers.

According to some embodiments, the second set of active transceivers comprises at least one transceiver not comprised in the first set of active transceivers.

According to some embodiments, the second set of active transceivers is different from the first set of active transceivers.

According to some embodiments, selecting a first set of active transceivers is performed with a first periodicity based on signal strength measurements at time instants associated with the first active TCI state, such as at every transmission of a synchronization signal block (SSB) associated with the first active TCI state, and/or at every transmission of a CSI-RS associated with the first active TCI state.

According to some embodiments, selecting a second set of active transceivers is performed with a second periodicity based on signal strength measurements at time instants associated with the second active TCI state, such as at every second transmission of a SSB associated with the second active TCI state and/or at every second transmission of a CSI-RS associated with the second active TCI state.

According to some embodiments, the second NW node is different from the first NW node.

According to some embodiments, the first set of active transceivers is set as a main active set at the first time instant, the second set of active transceivers is set as the main active set at the second time instant, the transceivers of the first set of active transceivers are set to a first sleep mode when the first set of active transceivers is no longer the main active set, wherein the transceivers of the second set of active transceivers are set to a first sleep mode when the second set of active transceivers is no longer the main active set, all transceivers not comprised in any of the first and second sets of active transceivers are set to a second sleep mode, and the transceivers in the second sleep mode requires less power than the transceivers in the first sleep mode.

According to a second aspect there is provided a computer program product comprising instructions, which, when executed on at least one processor of a processing device, cause the processing device to carry out the method according to the first aspect or any of the above-mentioned embodiments.

According to a third aspect there is provided a non-transitory computer-readable storage medium storing one or more programs configured to be executed by one or more processors of a processing device, the one or more programs comprising instructions which, when executed by the processing device, causes the processing device to carry out the method according to the first aspect or any of the above-mentioned embodiments. According to a fourth aspect there is provided a processing unit. The processing unit is comprisable in a wireless device (WD). Furthermore, the processing unit is connectable to a plurality of transceivers. Moreover, the processing unit is configured to obtain a first active Transmission Configuration Indicator (TCI) state for a first network, NW, node. Furthermore, the processing unit is configured to obtain a second TCI state for a second NW, node. Moreover, the processing unit is configured to select a first set of active transceivers from the plurality of transceivers based on the first active TCI state. The processing unit is configured to select a second set of active transceivers from the plurality of transceivers based on the second active TCI state. Furthermore, the processing unit is configured to configure the first set of active transceivers to receive, at a first time instant, a first physical channel/signal transmitted according to the first active TCI state. Moreover, the processing unit is configured to configure the second set of active transceivers to receive, at a second time instant, a second physical channel/signal transmitted according to the second active TCI state.

According to some embodiments, the first and second physical channels are the same physical channel.

According to some embodiments, the second time instant is different from the first time instant, the second time instant preferably occurring after the first time instant.

According to a fifth aspect there is provided a wireless device (WD). The WD comprises a plurality of transceivers. Each transceiver comprises an antenna, a low noise amplifier (LNA), a mixer, a variable gain amplifier (VGA), an analog to digital converter (ADC) and one or more filters. Furthermore, the WD comprises a baseband (BB) processor. The BB processor comprises the processing unit of the fourth aspect or of any other embodiment. Each transceiver is connected to the baseband processor.

According to a sixth aspect there is provided a wireless device (WD). The WD comprises a plurality of transceivers. Each transceiver comprises an antenna, a low noise amplifier (LNA), a mixer, and a variable gain amplifier (VGA). Furthermore, the WD comprises one or more digital interfaces. Each digital interface comprises an analog to digital converter (ADC) and one or more filters. Furthermore, each digital interface is connected to one or more of the plurality of transceivers. Moreover, the WD comprises a baseband (BB) processor. The BB processor comprises the processing unit of the fourth aspect or of any other embodiment. Each digital interface is connected to the baseband processor.

According to a seventh aspect there is provided a wireless device (WD). The WD comprises a plurality of transceivers. Each transceiver comprises an antenna, a low noise amplifier (LNA), and a mixer. Furthermore, the WD comprises one or more digital interfaces. Each digital interface comprises a variable gain amplifier (VGA), an analog to digital converter (ADC) and one or more filters. Furthermore, each digital interface is connected to one or more of the plurality of transceivers. Moreover, The WD comprises a baseband (BB) processor. The BB processor comprises the processing unit of the fourth aspect or of any other embodiment. Each digital interface is connected to the baseband processor.

Effects and features of the second, third, fourth, fifth, sixth and seventh aspects are fully or to a large extent analogous to those described above in connection with the first aspect and vice versa. Embodiments mentioned in relation to the first aspect are fully or largely compatible with the second, third, fourth, fifth, sixth, and seventh aspects and vice versa.

An advantage of some embodiments is that power consumption is reduced or optimized (for the wireless device).

Another advantage of some embodiments is that no redundant transceivers are activated (or that fewer transceivers and/or digital interfaces are activated), leading to a more energy efficient utilization.

Yet another advantage of some embodiments is that transceiver (and/or digital interface) utilization can be made more energy efficient (e.g., due to utilization of different sleep modes).

A further advantage of some embodiments is that memory utilization can be made more energy efficient (e.g., due to utilization of different sleep modes).

Yet a further advantage of some embodiments is that Layer 1 beam management is simplified (e.g., due to the utilization of a virtual active transceiver/antenna set, VAAS/VATS, manager for digital BF in wireless devices).

A further advantage of some embodiments is that Layer 1 beam management is simplified (e.g., due to the utilization of a multiple/main active transceiver/antenna set, Mu/Ma-AAS, manager for digital BF in wireless devices).

Yet a further advantage of some embodiments is that complexity is reduced.

Yet another advantage of some embodiments is that energy efficiency is further increased or improved.

A further advantage of some embodiments is that implementation is simplified.

Another further advantage of some embodiments is that handover latency is reduced.

Yet another further advantage of some embodiments is that handover latency is reduced, while energy efficiency is increased or improved.

A further advantage of some embodiments is that robustness of communication is increased.

The present disclosure will become apparent from the detailed description given below. The detailed description and specific examples disclose preferred embodiments of the disclosure by way of illustration only. Those skilled in the art understand from guidance in the detailed description that changes, and modifications may be made within the scope of the disclosure.

Hence, it is to be understood that the herein disclosed disclosure is not limited to the particular component parts of the device described or steps of the methods described since such apparatus and method may vary. It is also to be understood that the terminology used herein is for purpose of describing particular embodiments only and is not intended to be limiting. It should be noted that, as used in the specification and the appended claims, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The above objects, as well as additional objects, features, and advantages of the present disclosure, will be more fully appreciated by reference to the following illustrative and non-limiting detailed description of example embodiments of the present disclosure, when taken in conjunction with the accompanying drawings.

DETAILED DESCRIPTION

Figure 1:
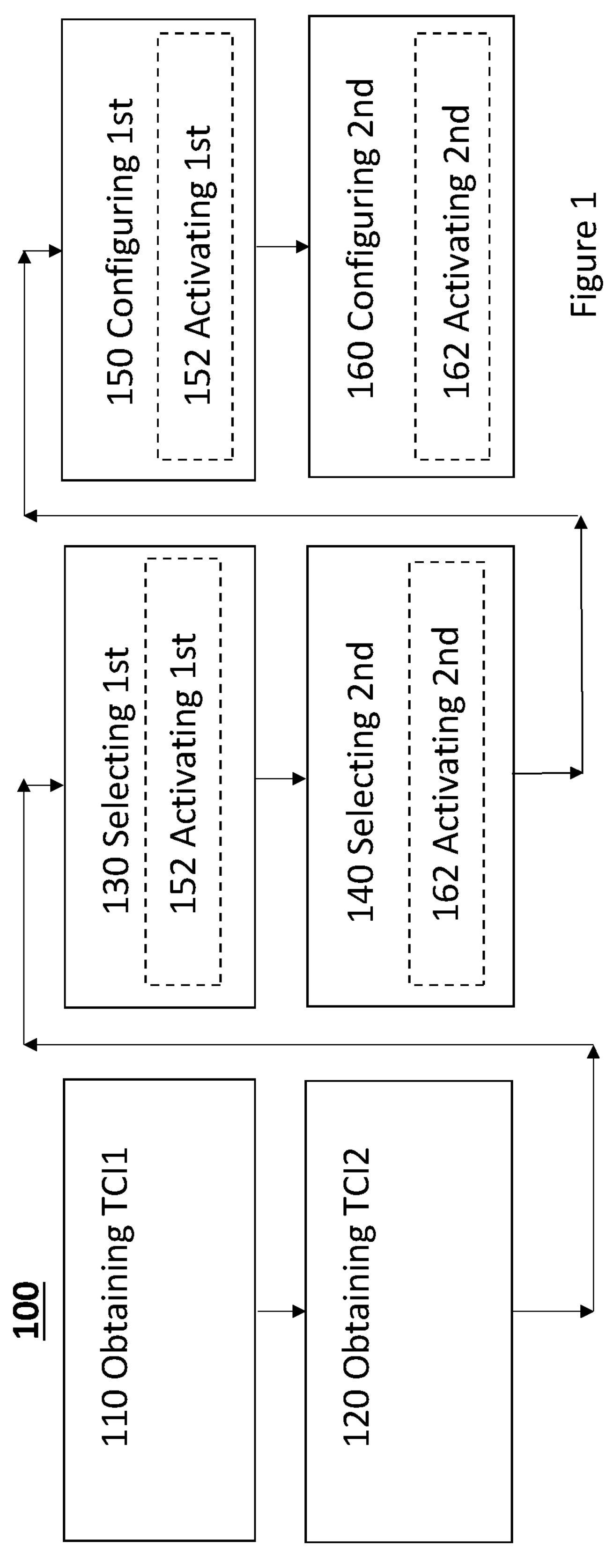
FIG. 1 is a flowchart illustrating method steps according to some embodiments.

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

Terminology

Below is referred to a processor/processing unit. The processor may be a digital processor. Alternatively, the processor may be a microprocessor, a microcontroller, a central processing unit, a co-processor, a graphics processing unit, a digital signal processor, an image signal processor, a quantum processing unit, or an analog signal processor. The processing unit may comprise one or more processors and optionally other units, such as a control unit.

Below is referred to a "network node" (NW). An NW node may be a remote radio unit (RRU), a repeater, a remote wireless node, or a base station, such as a radio base station (RBS), a Node B, an Evolved Node B (eNB) or a gNodeB (gNB).

Below is referred to a wireless device (WD). A wireless device is any device capable of transmitting or receiving signals wirelessly. Some examples of wireless devices are user equipment (UE), mobile phones, cell phones, smart phones, Internet of Things (IoT) devices, vehicle-to-everything (V2X) devices, vehicle-to-infrastructure (V2I) devices, vehicle-to-network (V2N) devices, vehicle-to-vehicle (V2V) devices, vehicle-to-pedestrian (V2P) devices, vehicle-to-device (V2D) devices, vehicle-to-grid (V2G) devices, fixed wireless access (FWA) points, and tablets.

Below is referred to an active transceiver. An active transceiver is a transceiver, which is utilized or ready to be utilized for transmission and/or reception, e.g., configured for transmission and/or reception or e.g., not in a (deep) sleep mode.

Below is referred to a Transmission Configuration Indicator (TCI) State. A TCI state contains parameters for configuring a quasi-co-location relationship between one or two downlink reference signals and the Demodulation reference signal (DM-RS) ports of the physical downlink shared channel (PDSCH), the DM-RS port of physical downlink control channel (PDCCH) or the channel state information reference signal (CSI-RS) port(s) of a CSI-RS resource.

Below is referred to an active TCI state. An active TCI state is the TCI state of a presently active transmit beam of a network node. In some standards, such as 3GPP standards, an active TCI state may be expressed as "indicated" (among potentially more than one "active" TCI state).

Below is referred to CORESET. The CORESETs configured for a device are the possible locations where the gNodeB (gNB) can put signalling messages, such as downlink control information (DCI).

The polarization of an antenna refers to the orientation of the electric field of the radio wave transmitted by it and is determined by the physical structure of the antenna and its orientation. E.g., an antenna composed of a linear conductor (such as a dipole or whip antenna) oriented vertically will result in vertical polarization; if turned on its side the same antenna's polarization will be horizontal.

Beam management in new radio (NR) is based on the network node configuring the WD (e.g., UE) with one or more TCI states, where each TCI state is associated with at least one reference signals, where a reference signal may be a synchronization signal associated with a particular beam index (or synchronization signal block, SSB, index) or a channel state information reference signal (CSI-RS). Each reference signal in a TCI state is associated with a quasi-co-location (QCL) information type which can be any of the following:

- Type A-Doppler shift, Doppler spread, average delay, delay spread
- Type B-Doppler shift, Doppler spread
- Type C-Doppler shift, average delay
- Type D-Spatial Rx parameter.

The QCL type specifies which properties can be inherited by the TCI state from an associated reference signal. For instance, QCL type A means that Doppler shift, Doppler spread, average delay, and delay spread measured for the reference signal is to be applied to the TCI state. Similarly, QCL type D means that the same spatial transmission filter, i.e., beamforming configuration, as used for receiving the reference signal can be applied to the TCI state.

The network node specifies to the WD which TCI state to use for a certain downlink channel or a certain CSI reference signal. The TCI state for a CSI reference signal may be another CSI reference signal or an SSB index. The list of TCI states provided by the network node to the WD may comprise a single TCI state or multiple TCI states. In the former case, the single TCI state applies to all channels and all reference signals. In the latter case, the network node further needs to activate TCI states and indicate to the WD which TCI states are to be used for reception of a downlink control channel (e.g., PDCCH), downlink shared data channel (e.g., PDSCH), or for a CSI reference signal (CSI-RS).

Configuration of TCI states is carried out by Radio Resource Control (RRC; Layer 3/network layer) signaling. Indication of TCI state for WD-specific PDCCH, activation of one or more TCI states for WD-specific PDSCH, and activation of TCI state for semi-persistent CSI-RS, is carried out by Media Access Control (MAC, Layer 2) signaling. Indication of which out of multiple active TCI state to use for reception of WD-specific PDSCH is indicated via Downlink Control Information (DCI, Layer 1) signaling.

The network node configures the WD to carry out measurements, such as Layer 1 reference signal received power (L1-RSRP), on one or more of the reference signals associated with the TCI states, and to report measurement results to the network node. Once a reference signal has been detected and reported by the WD, the associated TCI state is considered to be known to the WD for a time duration defined in the standard, provided that side conditions e.g., on Signal to Interference & Noise Ratio (SINR) of the reference signal exceeding some threshold value, are fulfilled. The implication of the TCI state being known to the WD differs between channels and configurations, but in general a TCI state activation is quicker when the target TCI state is known to the WD.

Often the WD need to track a plurality of (different) TCI states. Since the different TCI states may come from different directions and/or angles, each different TCI state may require a separate transceiver set. Therefore, there may be a need for monitoring a plurality of transceiver sets, e.g., the most suitable transceiver set for each of the plurality of TCI states in order to enable a change of TCI state with low latency and/or without interruption.

In the following, embodiments will be described where FIG. 1 illustrates method steps according to some embodiments. The method 100 is for a processing unit 600 (shown in FIG. 4). The processing unit 600 is comprised or comprisable in a wireless device (WD) 920 (shown in FIG. 4). Furthermore, the processing unit 600 is connected or connectable to a plurality of transceivers 500, . . . , 515 (shown in FIG. 4) directly or via one or more digital interfaces 400, . . . , 415 (shown in FIG. 4). In some embodiments, each transceiver 500, . . . , 515 is connected to one or more antennas 700, . . . , 715 (shown in FIG. 4). In some embodiments, each transceiver comprises first and second transmitter chains, each transmitter chain comprising first and second antennas, the first antenna with vertical polarization and the second antenna with horizontal polarization.

Moreover, in some embodiments, the WD 920 comprises the transceivers 500, . . . , 515, the processing unit 600 and optionally the digital interfaces 400, . . . , 415 and/or the one or more antennas 700, . . . , 715. The method comprises obtaining 110 a first active Transmission Configuration Indicator (TCI) state for a first network (NW) node 802. Furthermore, the method comprises obtaining 120 a second active TCI state for a second NW, node 802, 804. In some embodiments, the first and/or second NW nodes 802, 804 are remote network nodes. In some embodiments, the NW nodes 802, 804 are remote wireless nodes. Furthermore, in some embodiments, the first and second NW nodes 802, 804 are the same network node 802. Alternatively, the second NW node 804 is different from the first NW node 802. Moreover, the method comprises selecting 130 a first set 520 (shown in FIG. 5) of active transceivers from the plurality of transceivers 500, . . . , 515 based on (in dependence on, in accordance with) the first active TCI state. The method comprises selecting 140 a second set 522, 524 (shown in FIG. 5) of active transceivers from the plurality of transceivers 500, . . . , 515 based on (in dependence on, in accordance with) the second active TCI state. Furthermore, the method comprises configuring 150 the first set 520 of active transceivers to receive, at a first time instant, a first physical channel/signal transmitted according to the first active TCI state. Moreover, the method comprises configuring 160 the second set 522, 524 of active transceivers to receive, at a second time instant, a second physical channel/signal transmitted according to the second active TCI state. In some embodiments, the second time instant follows (directly after or with a time gap in-between) the first time instant. Some examples of physical channels are physical broadcast channel (PBCH), physical random access channel (PRACH), physical downlink shared channel (PDSCH), Physical Sidelink Shared Channel (PSSCH), Physical Sidelink Control Channel (PSCCH), and physical downlink control channel (PDCCH).

In some embodiments, the second physical channel/signal is different from the first physical channel/signal. However, in some embodiments, the second physical channel/signal is the same as the first physical channel/signal. In these embodiments (when the first and second physical channel/signal is the same), the first and second time instants are different (e.g., the second time instant following after the first time instant). E.g., if both the first and second physical channels are PDCCH (or PDSCH), the first physical channel may be associated with (comprised or contained in) a first control resource set (CORESET) and the second physical channel may be associated with (comprised or contained in) a second CORESET, or the first physical channel may be associated with (comprised or identified in) a first radio network temporary identity (RNTI) and the second physical channel may be associated with (comprised or identified in) a second RNTI (different from the first RNTI). Furthermore, if the first and second physical signals are channel state information reference signals (CSI-RS), the first physical signal may be associated with a first resource set and the second physical signal may be associated with a second resource set (different from the first resource set).

In some embodiments, the step of obtaining 120 is performed at the same time as the step of obtaining 110. However, in some embodiments, the step of obtaining 120 is performed after the steps of selecting 130 and configuring 150 (but before the steps of selecting 140 and configuring 160). Likewise, in some embodiments, the step of selecting 140 is performed at the same time as the step of selecting 130. However, in some embodiments, the step of selecting 140 is performed after the step of configuring 150 (but before the step of configuring 160). In some embodiments, the steps 110, 120, 130, 140, 150 and 160 are repeated, e.g., with obtained updated active TCI states. The repeated steps may be repeated until a stop repeat criterion is met. A stop criterion may be that the steps have been repeated a user-definable number of times or that the processing unit 600 enters a stand-by mode or is turned off or that the WD 920 enters a stand-by mode or is turned off, e.g., by obtaining a connection release message, causing the radio communication to be turned off.

In some embodiments, the second active TCI state is obtained based on (in dependence on, in accordance with) information, such as downlink control information (DCI) from the PDCCH, control information sent via the Medium Access Control (MAC) layer or via the network layer, e.g., in a Radio Resource Control (RRC) message, received (e.g., at the first time instant) via the first physical channel.

In some embodiments, the first physical channel is a physical downlink control channel, PDCCH, and the second physical channel is a physical downlink shared channel, PDSCH.

In some embodiments, the first and second physical channels are PDCCH. The WD 920 may be monitoring PDCCH in more than one CORESET, and the (common) PDCCH may have a different active TCI state than a WD-specific PDCCH.

In some embodiments, the first and second physical channels are PDSCH. The WD 920 may be receiving multiple PDSCHs, e.g., a common PDSCH and a WD-specific PDSCH, and the common PDSCH may have a different active TCI state than the WD-specific PDSCH. The common PDSCH and/or the WD-specific PDSCH may follow after a PDCCH.

In some embodiments, one or both of the physical signals are downlink reference signals, such as channel state information reference signals (CSI-RS). In these embodiments, measurements on beamformed, full-bit SSBs may be performed.

In some embodiments, the first physical channel is a PDCCH, and the second physical signal is a CSI-RS. In some embodiments, the first physical channel is a physical downlink control channel, PDCCH, and the second physical channel is a physical broadcast channel (PBCH). In these embodiments, the second active TCI state may be an implicit TCI state, e.g., retrieved from a detected synchronization signal block (SSB).

In some embodiments, the first physical channel is a PDSCH, and the second physical channel is the same instance of a repeated PDSCH.

Figure 2:
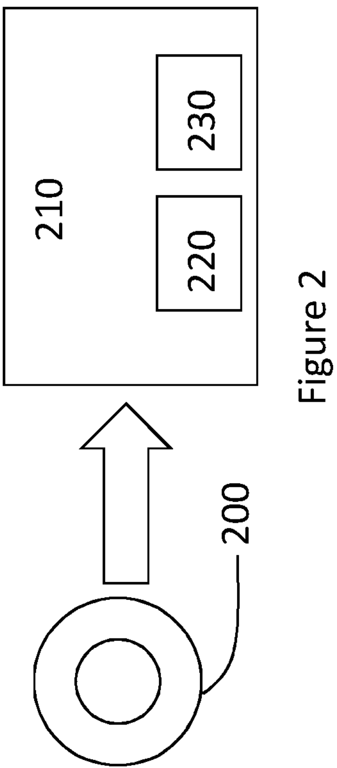
FIG. 2 is a schematic drawing illustrating a computer readable medium according to some embodiments.

According to some embodiments, a computer program product comprising a non-transitory computer readable medium 200, such as a punch card, a compact disc (CD) ROM, a read only memory (ROM), a digital versatile disc (DVD), an embedded drive, a plug-in card, or a universal serial bus (USB) memory, is provided. FIG. 2 illustrates an example computer readable medium in the form of a compact disc (CD) ROM 200. The computer readable medium has stored thereon, a computer program comprising program instructions. The computer program is loadable into a data processor (PROC) 220, which may, for example, be comprised in a computer 210 or a computing device or the processing unit 600. When loaded into the data processor 220, the computer program may be stored in a memory (MEM) 230 associated with or comprised in the data processor 220. According to some embodiments, the computer program may, when loaded into and run by the data processor 220, cause execution of method steps according to, for example, the method illustrated in any of FIGS. 1 and 8, which are described herein. Furthermore, in some embodiments, there is provided a computer program product comprising instructions, which, when executed on at least one processor of a processing device, cause the processing device to carry out the method illustrated in any of FIGS. 1 and 8. Moreover, in some embodiments, there is provided a non-transitory computer-readable storage medium storing one or more programs configured to be executed by one or more processors of a processing device, the one or more programs comprising instructions which, when executed by the processing device, causes the processing device to carry out the method illustrated in any of FIGS. 1 and 8.

Figure 3:
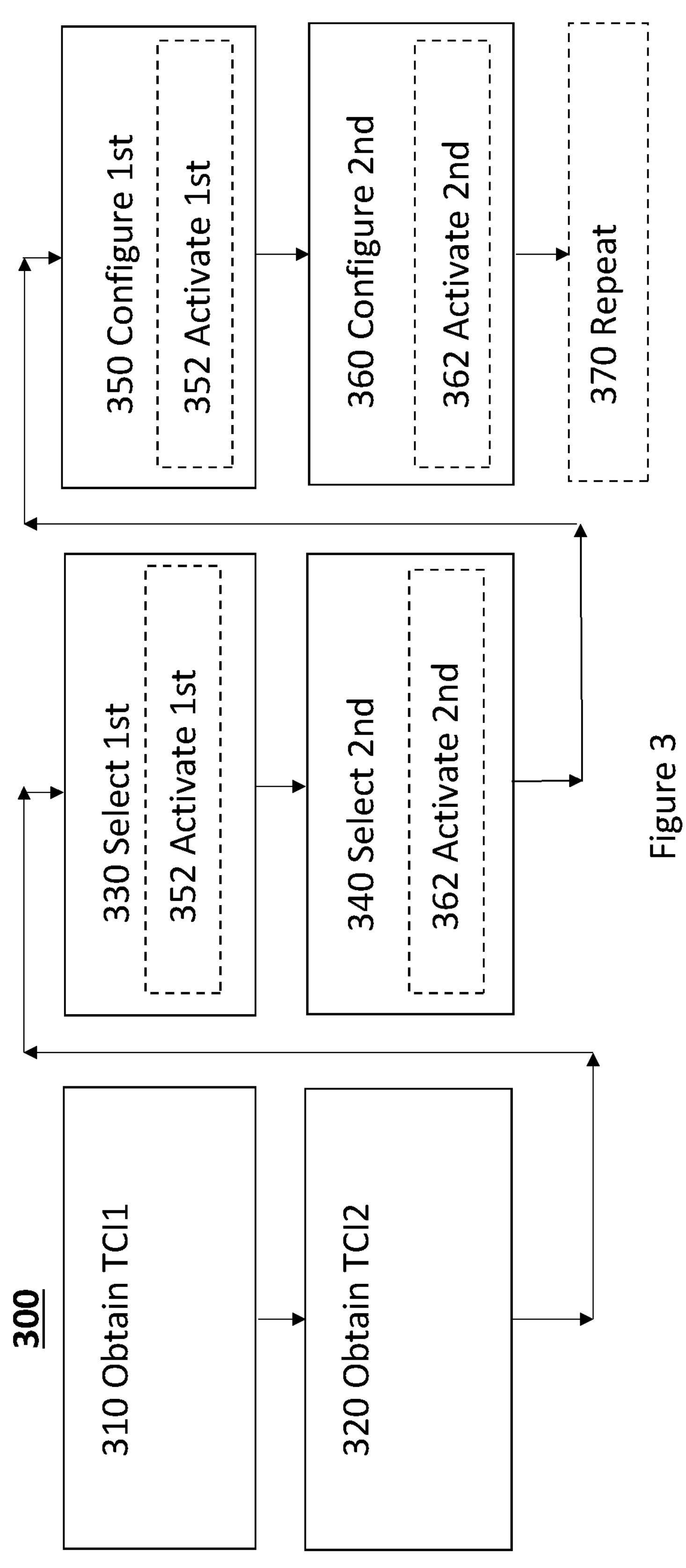
FIG. 3 is a flowchart illustrating actions/method steps implemented in a processing unit according to some embodiments.

FIG. 3 illustrates actions/method steps implemented in a processing unit 600, or in control circuitry (300) thereof/comprised therein, according to some embodiments. The processing unit 600 is comprised or comprisable in a wireless device (WD) 920 (shown in FIG. 4). Furthermore, the processing unit 600 is connected or connectable to a plurality of transceivers 500, . . . , 515 (shown in FIG. 4) directly or via one or more digital interfaces 400, . . . , 415 (shown in FIG. 4). In some embodiments, each transceiver 500, . . . , 515 is connected to one or more antennas 700, . . . , 715 (shown in FIG. 4). Moreover, in some embodiments, the WD 920 comprises the transceivers 500, . . . , 515, the processing unit 600 and optionally the digital interfaces 400, . . . , 415 and/or the one or more antennas 700, . . . , 715. The processing unit 600 (or the control circuitry thereof) is configured to obtain 310 a first active Transmission Configuration Indicator, TCI, state for a first network, NW, node 802. To this end, the processing unit 600 may be associated with (e.g., operatively connectable, or connected, to) a first obtainment unit (e.g., first obtainment circuitry or a first obtainer). Furthermore, the processing unit 600 (or the control circuitry thereof) is configured to obtain 320 a second active TCI state for a second NW, node 802, 804. To this end, the processing unit 600 may be associated with (e.g., operatively connectable, or connected, to) a second obtainment unit (e.g., second obtainment circuitry or a second obtainer). In some embodiments, the second obtainment unit is the same as the first obtainment unit. Moreover, the processing unit 600 (or the control circuitry thereof) is configured to select 330 a first set 520 of active transceivers from the plurality of transceivers 500, . . . , 515 based on (in dependence on, in accordance with) the first active TCI state. To this end, the processing unit 600 may be associated with (e.g., operatively connectable, or connected, to) a first selection unit (e.g., first selecting circuitry or a first selector). The processing unit 600 (or the control circuitry thereof) is configured to select 340 a second set 522, 524 of active transceivers from the plurality of transceivers 500, . . . , 515 based on (in dependence on, in accordance with) the second active TCI state. To this end, the processing unit 600 may be associated with (e.g., operatively connectable, or connected, to) a second selection unit (e.g., second selecting circuitry or a second selector). In some embodiments, the second selection unit is the same as the first selection unit. Furthermore, the processing unit 600 (or the control circuitry thereof) is configured to configure 350 the first set 520 of active transceivers to receive, at a first time instant, a first physical channel/signal transmitted according to the first active TCI state. To this end, the processing unit 600 may be associated with (e.g., operatively connectable, or connected, to) a first configuration unit (e.g., first configuring circuitry or a first configurer). Moreover, the processing unit 600 (or the control circuitry thereof) is configured to configure 360 the second set 522, 524 of active transceivers to receive, at a second time instant, a second physical channel/signal transmitted according to the second active TCI state. To this end, the processing unit 600 may be associated with (e.g., operatively connectable, or connected, to) a second configuration unit (e.g., second configuring circuitry or a second configurer). In some embodiments, the first and second physical channels are the same physical channel. Furthermore, in some embodiments, a second configuration unit is the same as the first configuration unit. Additionally, or alternatively, the second time instant is different from the first time instant. Preferably the second time instant occurs after, e.g., later than, the first time instant. In some embodiments, the step of configure 350 the first set 520 of active transceivers comprises activating 352 the first set 520 of active transceivers. Additionally, or alternatively, the step of configure 360 the second set 522, 524 of active transceivers comprises activating 362 the second set 522, 524 of active transceivers. Alternatively, activating 352 is comprised in the step of select 330 and activating 362 is comprised in the step of select 340. In some embodiments, the processing unit 600 (or the control circuitry thereof) is configured to repeat 370 one or more of the steps 310, 320, 330, 340, 350 and 360. To this end, the processing unit 600 (or the controlling circuitry thereof) may be associated with (e.g., operatively connectable, or connected, to) a repetition unit (e.g., repetition circuitry or a repeater).

Figure 4:
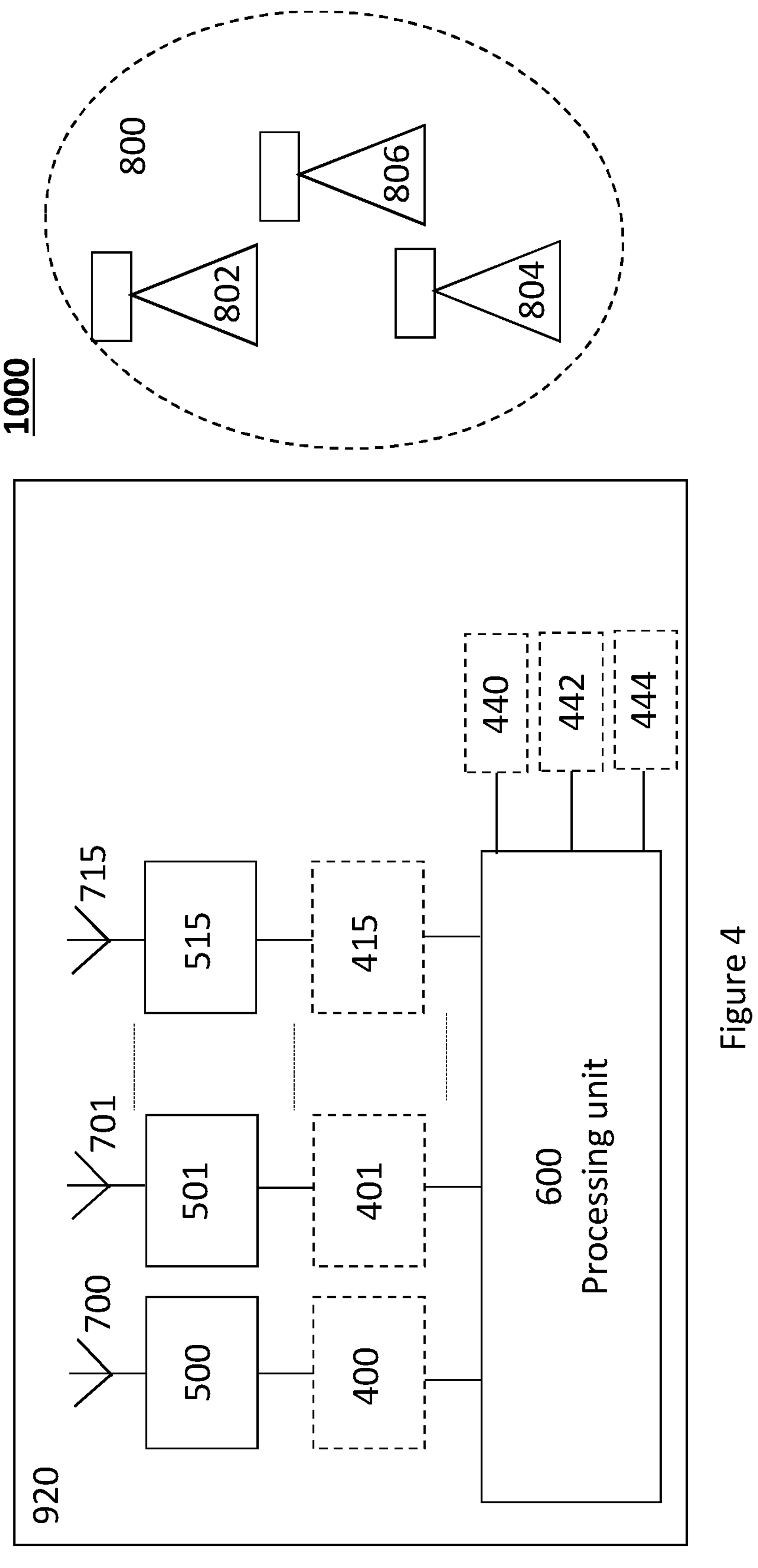
FIG. 4 is a schematic drawing illustrating a system comprising a wireless device and base stations according to some embodiments.

FIG. 4 illustrates a system 1000 comprising one or more wireless devices (WD) 920 and network nodes 802, 804, 806 such as base stations, such as gNBs, eNBs, RBS or remote radio units (RRUs), or remote wireless nodes, according to some embodiments. The wireless device 920 comprises a processing unit 600. Furthermore, the processing unit 600 is connected or connectable to a plurality of transceivers 500, . . . , 515 directly or via one or more digital interfaces 400, . . . , 415. Moreover, in some embodiments, each transceiver 500, . . . , 515 is connected to one or more antennas 700, . . . , 715. In some embodiments, the WD 920 comprises the transceivers 500, . . . , 515, the processing unit 600 and optionally the digital interfaces 400, . . . , 415 and/or the one or more antennas 700, . . . , 715. The WD 920 is able/configurable to communicate with the base stations 802, 804 (e.g., via antennas 700, . . . , 715 and transceivers 500, . . . , 515). Furthermore, in some embodiments, the WD 920 comprises one or more sensors. The one or more sensors may comprise one or more motion sensors 440, one or more Global Positioning System (GPS) receivers 442, one or more cameras 444, one or more gyroscopes, one or more accelerometers, one or more compasses, one or more barometers, one or more light sensors, one or more fingerprint sensors and one or more proximity sensors. Moreover, in some embodiments, the one or more sensors is utilized to determine a spatial position of the WD 920. The processing unit 600 (or the baseband processor 910 described in connection with FIG. 5 below) may then utilize the determined spatial position (of the WD 920) for selecting the first and second sets 520, 522, 524 of active transceivers.

Returning to FIG. 1, selecting 130 a first set 520 of active transceivers and/or selecting 140 a second set 522, 524 of active transceivers is, in some embodiments, based on (in dependence on, in accordance with) the determined spatial position (of the WD 920) and/or knowledge about how the plurality of transceivers are distributed in/inside the WD 920 and/or knowledge about where (in what directing and/or which angle) the NW nodes 802, 804 are located.

Figure 5:
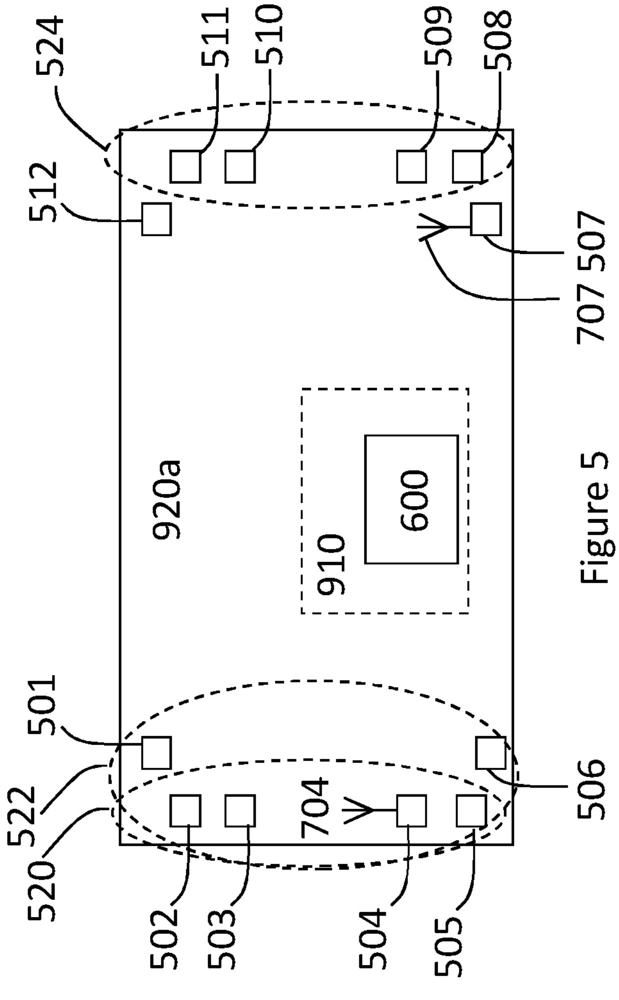
FIG. 5 is a schematic drawing illustrating a wireless device according to some embodiments.

FIG. 5 illustrates a wireless device (WD) **920*a* according to some embodiments. In some embodiments, the WD 920*a* is identical to the WD 920 described above in connection with FIG. 4. The WD 920*a* comprises a processing unit 600. In some embodiments, the processing unit 600 is comprised in a baseband (BB) processor 910. Furthermore, the WD 920*d* comprises a plurality of transceivers 500 . . . , 515. The plurality of transceivers 500 . . . , 515 are connected or connectable to the processing unit 600, directly or via one or more digital interfaces 400, . . . , 415. Moreover, in some embodiments, each transceiver 500, . . . , 515 is connected to one or more antennas 700, . . . , 715. The transceivers 500, . . . , 515 and the antennas 700, . . . , 715 are distributed in different orientations, such as in X-, Y- and Z-directions in a XYZ coordinate system, around the WD 920*a*. In some embodiments, the antennas 700, . . . , 715 are comprised in antenna panels, which panels are distributed in different orientations, such as in X-, Y- and Z-directions in a XYZ coordinate system. A first set 520 of the plurality of transceivers 500 . . . , 515 comprises active transceivers 502, . . . , 505. Furthermore, a second set, comprising the set 522, of the plurality of transceivers 500 . . . , 515 comprises active transceivers 501, . . . , 506. Alternatively, or additionally, the second set comprises the set 524 comprising active transceivers 508, . . . , 511**.

Returning to FIG. 1, in some embodiments, configuring 150 the first set 520 of active transceivers comprises activating 152 the first set 520 of active transceivers. Additionally, or alternatively, configuring 160 the second set 522, 524 of active transceivers comprises activating 162 the second set 522, 524 of active transceivers. Alternatively, activating 152 is comprised in selecting 130 and activating 162 is comprised in selecting 140. In some embodiments, each transceiver 500, . . . , 515 is associated with (comprises or is connected to) a low noise amplifier (LNA), a variable gain amplifier (VGA), a power amplifier (PA) and a phase locked loop (PLL). In these embodiments activating 152 and/or activating 162 comprises turning on one or more of the LNA, the VGA, the PA and the PLL for each of the transceivers comprised in the first and/or the second set 520, 522, 524 of transceivers.

In some embodiments, the first and second active TCI states are different. In these embodiments, the first set 520 of active transceivers comprises at least one transceiver 502, . . . , 505 not comprised in the second set 524 of active transceivers. Alternatively, or additionally, the second set 522, 524 of active transceivers comprises at least one transceiver 501, 506, 508, 509, 510, 511 not comprised in the first set 520 of active transceivers. Alternatively, the first and second TCI states are the same TCI state. In these embodiments, the first and second sets 520, 522 of active transceivers comprises the same transceivers.

In some embodiments, none of the transceivers of the second set 524 of active transceivers are comprised in the first set 520 of active transceivers. i.e., the first and second sets 520, 524 of active transceivers are non-overlapping. Alternatively, in some embodiments, at least one transceiver belongs to both the first and second sets 520, 522 of active transceivers, i.e., the first and second sets 520, 522 of active transceivers are overlapping.

In some embodiments, selecting 130 a first set 520 of active transceivers is performed with a first periodicity based on (in dependence on, in accordance with) signal strength/quality measurements at time instants associated with the first active TCI state, such as at every transmission of a synchronization signal block, SSB, associated with the first active TCI state (i.e. at every transmission of an SSB having an index associated with the first active TCI state), and/or at every transmission of a CSI-RS associated with the first active TCI state (i.e., at every transmission of a CSI-RS with a CSI-RS resource associated with the first active TCI state). Additionally, or alternatively, selecting 140 a second set 522, 524 of active transceivers is performed with a second periodicity based on (in dependence on, in accordance with) signal strength/quality measurements at time instants associated with the second active TCI state, such as at every second transmission of an SSB associated with the second active TCI state (i.e. at every second transmission of an SSB having an index associated with the second active TCI state), and/or at every second transmission of a CSI-RS associated with the second active TCI state (i.e., at every second transmission of a CSI-RS with a CSI-RS resource associated with the second active TCI state). In some embodiments, the first periodicity is shorter (lower or smaller) than (or equal to) the second periodicity. In some embodiments, the first periodicity is 1 ms, 2 ms, 5 ms, 10 ms, 20 ms, 40 ms, 80 ms, 160 ms, or 320 ms. In some embodiments, the second periodicity is 1 ms, 2 ms, 5 ms, 10 ms, 20 ms, 40 ms, 80 ms, 160 ms, or 320 ms. Furthermore, in some embodiments, the second periodicity is (at least) twice as long as the first periodicity. By making the first periodicity shorter than the second periodicity, energy efficiency is improved/increased. The signal strength (measurements) may comprise one or more of received power (RP), such as one or more of a reference signal received power (RSRP), a secondary synchronization signal reference signal received power (SS-RSRP), a channel state information reference symbols reference signal received power (CSI-RS RSRP) and a Layer 1 reference signal received power (L1-RSRP), or a received signal strength indication, such as received signal strength indicator (RSSI). Preferably the signal strength comprises/is an RSRP. The signal quality (measurements) may comprise one or more of received quality (RQ), such as reference signals received quality (RSRQ), secondary synchronization signal reference signal received quality (SS-RSRQ), channel state information reference symbols reference signal received quality (CSI-RS RSRQ), signal to noise ratio (SNR), or signal to interference and noise ratio (SINR), such as secondary synchronization signal to interference and noise ratio (SS-SINR) or Layer 1 signal to interference and noise ratio (L1-SINR).

In some embodiments, the measured signal strength/quality is a combined measured signal strength/quality, i.e., the combined value (combined as a sum; or an average/mean/median value) of measured signal strength/quality values for each of the transceivers in the set, e.g., the first set 520 or the second set 522, 524. Furthermore, in some embodiments, selecting 130 comprises selecting the first set 520 of active transceivers as a set of transceivers that maximizes the signal strength/quality. Alternatively, selecting 130 comprises selecting the smallest set of transceivers (e.g., the set with the fewest transceivers) that has a signal strength/quality (value) higher than a first signal strength/quality threshold. Moreover, in some embodiments, selecting 140 comprises selecting the second set 522, 524 of active transceivers as a set of transceivers that maximizes the signal strength/quality. Alternatively, selecting 140 comprises selecting the smallest set of transceivers (e.g., the set with the fewest transceivers) that has a signal strength/quality (value) higher than a second signal strength/quality threshold. By selecting the smallest set of transceivers that has a signal strength/quality (value) higher than a signal strength/quality threshold, power consumption may be reduced, while a sufficient signal strength/quality is still achieved. In some embodiments, the signal strength/quality thresholds are the same. Alternatively, the first and second signal strength/quality thresholds are different, e.g., the first signal strength/quality threshold is higher than the second signal strength/quality threshold. By having different thresholds for different TCIs, robustness of communication may be increased, e.g., since some TCI states (such as TCI states for PDCCH) are more important to detect than other TCI states (such as TCI states for PDSCH).

In some embodiments, the first set 520 of active transceivers is set, e.g., by an active antenna/transceiver set (AAS/ATS) manager, as a main active set at the first time instant. The AAS/ATS manager is, in some embodiments, comprised in the processing unit 600. And, in some embodiments, the first set 520 remains the main active set until another set is set as the main active set. Alternatively, the first set 520 remains the main active set for a predetermined time period. The second set 522, 524 of active transceivers is set, e.g., by the AAS/ATS manager, as the main active set at the second time instant. And, in some embodiments, the second set 522, 524 remains the main active set until another set is set as the main active set. Alternatively, the second set 522, 524 remains the main active set for a predetermined time period. Furthermore, the transceivers 502, 503, 504, 505 of the first set 520 of active transceivers are set, e.g., by the AAS/ATS manager, to a first sleep mode when the first set 520 of active transceivers is no longer the main active set. In some embodiments, the transceivers 502, 503, 504, 505 of the first set 520 remains in the first sleep mode while the first set 520 is not the main active set or until the first set 520 again is set to the main active set. Moreover, the transceivers 501, 502, 503, 504, 505, 506, 508, 509, 510, 511 of the second set 522, 524 of active transceivers are set, e.g., by the AAS/ATS manager, to a first sleep mode when the second set 522, 524 of active transceivers is no longer the main active set. In some embodiments, the transceivers 501, 502, 503, 504, 505, 506, 508, 509, 510, 511 of the second set 522, 524 remains in the first sleep mode while the second set 522, 524 is not the main active set or until the second set 522, 524 again is set to the main active set. All transceivers not comprised in any of the first and second sets 520, 522, 524 of active transceivers are set, e.g., by the AAS/ATS manager, to a second sleep mode. The transceivers in the second sleep mode requires less power than the transceivers in the first sleep mode. In some embodiments, the first sleep mode is a half-sleep mode, in which mode the PLL is still running/turned on while the LNA, the PA and the VGA are turned off, and the second sleep mode is a deep sleep mode, in which mode the PLL, the LNA, the PA and the VGA are turned off. Thus, in these embodiments, the transceivers in the second sleep mode requires less power than the transceivers in the first sleep mode (since all of the PLL, the LNA, the PA and the VGA are turned off). By setting all transceivers not comprised in any of the first and second sets 520, 522, 524 of active transceivers to a second sleep mode power is reduced/saved.

Figures 6A, 6B:
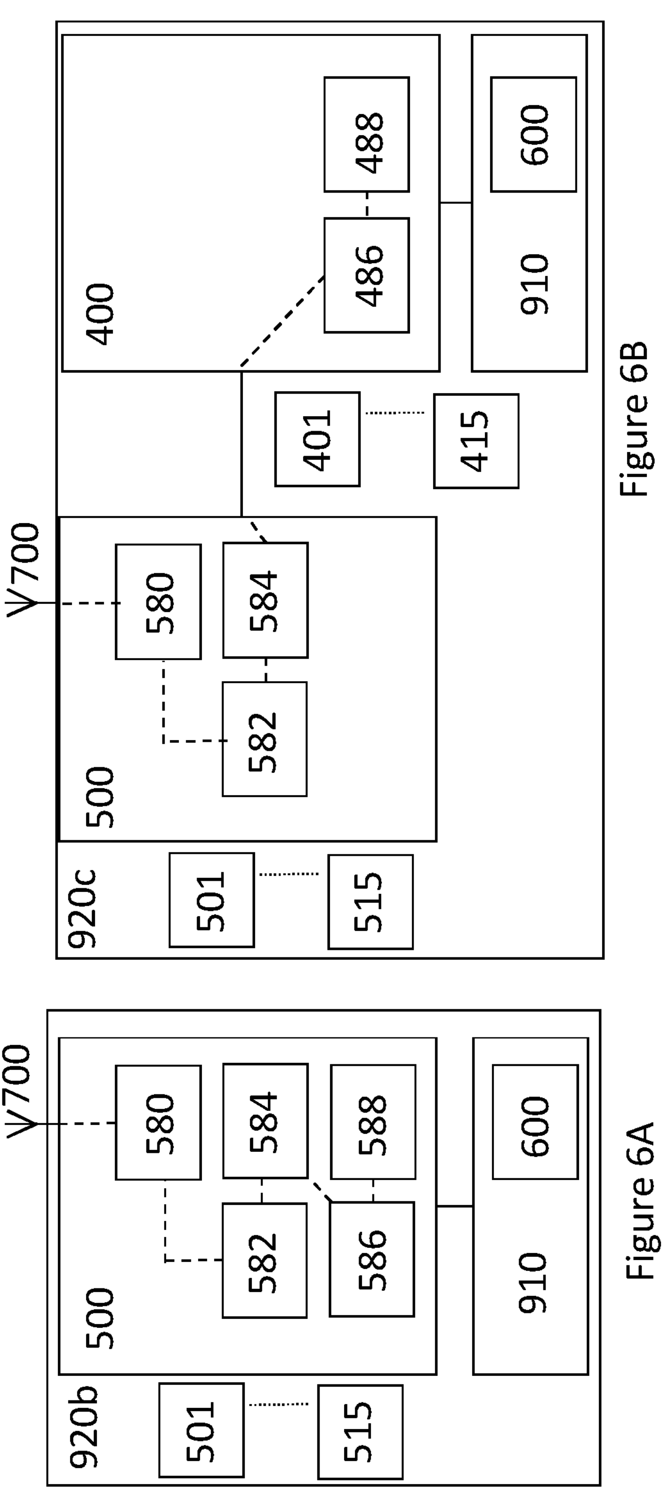
FIG. 6A is a schematic drawing illustrating a wireless device according to some embodiments.
FIG. 6B is a schematic drawing illustrating a wireless device according to some embodiments.

FIG. 6A illustrates a wireless device (WD) 920*a* according to some embodiments. In some embodiments, the WD 920*b* is the WD 920 described above/below. The WD 920*b* comprises a plurality of transceivers 500, . . . , 515. Each transceiver 500, . . . , 515 comprises one or more antennas 700, a low noise amplifier (LNA) 580, a mixer 582, a variable gain amplifier (VGA) 584, an analog to digital converter (ADC) 586 and one or more filters 588. Furthermore, the WD 920*b* comprises a baseband (BB) processor 910. The BB processor 910 comprises the processing unit 600 described above in connection with FIGS. 3-4 and/or in connection with FIG. 9 described below. In some embodiments, (for each transceiver 500, . . . , 515) the antenna(s) 700 is connected to the LNA 580. In some embodiments, (for each transceiver 500, . . . , 515) the LNA 580 is connected (directly or via an amplifier) to the mixer 582. In some embodiments, (for each transceiver 500, . . . , 515) the mixer 582 is connected to the VGA 584. In some embodiments, (for each transceiver 500, . . . , 515) the VGA 584 is connected (directly or via one or more of a second mixer, an integrator, and one or more analog filters) to the ADC 586. In some embodiments, (for each transceiver 500, . . . , 515) the ADC 586 is connected to the one or more filters 588. Furthermore, the processing unit 600 or the BB processor 910 is directly connected or connectable (e.g., via input-output interfaces) to the plurality of transceivers 500, . . . , 515.

FIG. 6B illustrates a wireless device (WD) 920*c* according to some embodiments. In some embodiments, the WD 920*c* is the WD 920 described above/below. The WD 920*c* comprises a plurality of transceivers 500, . . . , 515. Each transceiver 500, . . . , 515 comprises one or more antenna(s) 700, a low noise amplifier (LNA) 580, a mixer 582, and a variable gain amplifier (VGA) 584. Moreover, the WD 920*c* comprises one or more digital interfaces 400, . . . , 415. Each digital interface 400, . . . , 415 comprises an analog to digital converter (ADC) 486 and one or more filters 488. Furthermore, each digital interface 400, . . . , 415 is connected to one or more of the plurality of transceivers 500, . . . , 515. Moreover, the WD 920*c* comprises a baseband (BB) processor 910. The BB 910 comprises the processing unit 600 described above in connection with FIGS. 3-4 and/or in connection with FIG. 9 described below. In some embodiments, (for each transceiver 500, . . . , 515) the antenna(s) 700 is connected to the LNA 580. In some embodiments, (for each transceiver 500, . . . , 515) the LNA 580 is connected (directly or via an amplifier) to the mixer 582. In some embodiments, (for each transceiver 500, . . . , 515) the mixer 582 is connected to the VGA 584. In some embodiments, (for each transceiver 500, . . . , 515) the VGA 584 is connected (directly or via one or more of a second mixer, an integrator, one or more analog filters, and an input-output interface) to the ADC 486. In some embodiments, (for each digital interface 400, . . . , 415) the ADC 486 is connected to the one or more filters 488. Furthermore, the processing unit 600 or the BB processor 910 is connected or connectable to the plurality of transceivers 500, . . . , 515 via the one or more digital interfaces 400, . . . , 415.

Figure 6C:
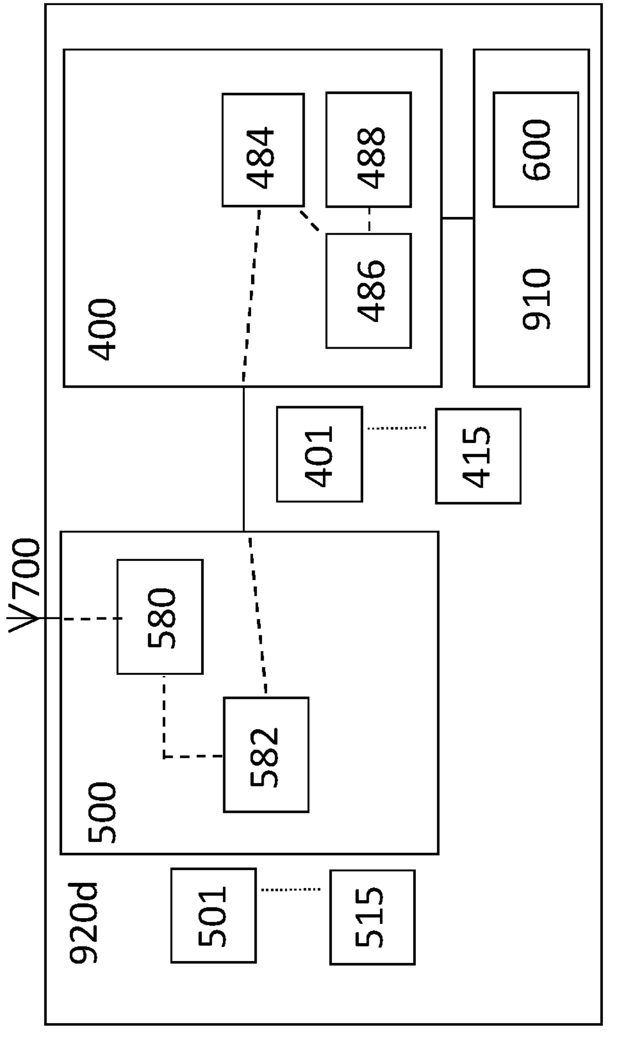
FIG. 6C is a schematic drawing illustrating a wireless device according to some embodiments.
Figures 7A, 7B:
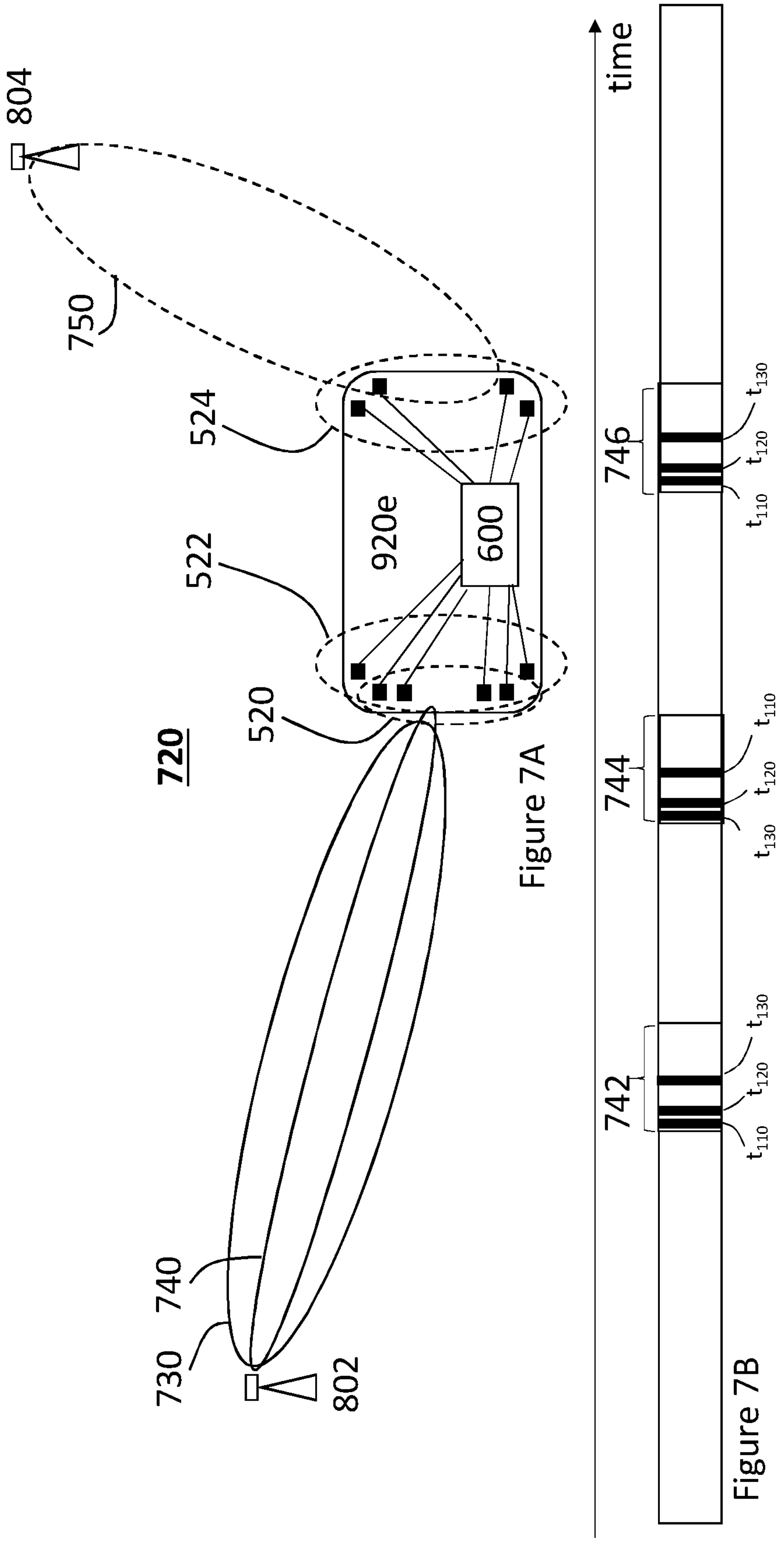
FIG. 7A is a schematic drawing illustrating a system comprising one or more wireless devices and network nodes.
FIG. 7B is a schematic drawing illustrating a timing diagram of received downlink information at a wireless device.

FIG. 6C illustrates a wireless device (WD) 920*d* according to some embodiments. In some embodiments, the WD 920*d* is the WD 920. The WD 920*d* comprises a plurality of transceivers 500, . . . , 515. Each transceiver 500, . . . , 515 comprises one or more antenna(s) 700, a low noise amplifier (LNA) 580, and a mixer 582. Moreover, the WD 920*d* comprises one or more digital interfaces 400, . . . , 415. Each digital interface 400, . . . , 415 comprises a variable gain amplifier (VGA) 484, an analog to digital converter (ADC) 486 and one or more filters 488. Furthermore, each digital interface 400, . . . , 415 is connected to one or more of the plurality of transceivers 500, . . . , 515. Moreover, the WD 920*d* comprises a baseband (BB) processor 910. The BB 910 comprises the processing unit 600 described above in connection with FIGS. 3-4 and/or in connection with FIG. 9 described below. In some embodiments, (for each transceiver 500, . . . , 515) the antenna(s) 700 is connected to the LNA 580. In some embodiments, (for each transceiver 500, . . . , 515) the LNA 580 is connected (directly or via an amplifier) to the mixer 582. In some embodiments, (for each transceiver 500, . . . , 515) the mixer 582 is connected to the VGA 484 (e.g., via an input-output interface). In some embodiments, (for each digital interface 400, . . . , 415) the VGA 484 is connected (directly or via one or more of a second mixer, an integrator, and one or more analog filters) to the ADC 486. In some embodiments, (for each digital interface 400, . . . , 415) the ADC 486 is connected to the one or more filters 488. Furthermore, the processing unit 600 or the BB processor 910 is connected or connectable to the plurality of transceivers 500, . . . , 515 via the one or more digital interfaces 400, . . . , 415. In some embodiments, the ADC and/or the one or more filters is comprised in the BB processor 910. In these embodiments, the interface is analog. Furthermore, in some embodiments, the one or more filters 488, 588 comprises downsampling and/or upsampling processing units for downsampling and/or upsampling. FIG. 7A illustrates a system 720 comprising one or more wireless devices (WD) 920*e* and network nodes 802, 804. In some embodiments, the system 720 is the same as the system 1000 depicted in FIG. 4 and described above. As seen in FIG. 7A, the WD 920*e* comprises a processing unit 600 and transceivers distributed around the WD 920*e*. In some embodiments, the WD 920*e* is identical to the WD 920 depicted in FIG. 5 and described above in connection with FIG. 5. Furthermore, the network node 802 is (associated with) a serving cell, whereas the network node 804 is (associated with) a neighbouring cell.

Referring to FIG. 7A and FIG. 3, in some embodiments, the processing unit 600 is configured to obtain 310 a first active Transmission Configuration Indicator, TCI, state 730 for a first network, NW, node 802. Furthermore, in some embodiments, the processing unit 600 is configured to obtain 320 a second active TCI state 740, 750 for a second NW node 802, 804. In some embodiments, the second NW node 802 is the same as the first NW node 802. Moreover, the processing unit 600 is configured to select 330 a first set 520 of active transceivers from the plurality of transceivers 500, . . . , 515 based on (in dependence on, in accordance with) the first active TCI state 730. The processing unit 600 is configured to select 340 a second set 522, 524 of active transceivers from the plurality of transceivers 500, . . . , 515 based on (in dependence on, in accordance with) the second active TCI state 740, 750. Furthermore, the processing unit 600 is configured to configure 350 the first set 520 of active transceivers to receive, at a first time instant, a first physical channel/signal transmitted according to the first active TCI state 730. In some embodiments, the first time instant is at every transmission of an SSB 742, 746 and/or at every transmission of a CSI-RS 744 (as further explained in connection with FIG. 7B below). However, in some embodiments, the first time instant is at every DM-RS. Moreover, the processing unit 600 is configured to configure 360 the second set 522, 524 of active transceivers to receive, at a second time instant, a second physical channel/signal transmitted according to the second active TCI state 740, 750. In some embodiments, the second time instant is at every second transmission of an SSB 742, 746 or at every second transmission of an SSB 746 and/or at every second transmission of an CSI-RS 744 (as further explained in connection with FIG. 7B below). However, in some embodiments, the second time instant is at every DM-RS. In some embodiments, the second active TCI state 740 is obtained based on (in dependence on, in accordance with) information received via the first physical channel. Furthermore, in some embodiments, the second active TCI state 740, 750 is different from the first active TCI state 730.

FIG. 7B illustrates a timing diagram of some downlink information received at the WD 920*e*. The downlink information comprises a first synchronization signal block (SSB) burst 742, a channel state information reference signal (CSI-RS) 744 (in the form of a burst), and a second SSB burst 746. An SSB may comprise a first OFDM symbol (at least partly) utilized for the primary synchronization signal (PSS), a second OFDM symbol utilized for the physical broadcast channel (PBCH), a third OFDM symbol utilized for the secondary synchronization signal (SSS) and for the physical broadcast channel (PBCH) and a fourth OFDM symbol utilized for the physical broadcast channel (PBCH). The one or more SSBs may be comprised in an SSB burst, which may be up to 5 ms long. The first SSB burst 742 comprises at a first time instant T110 an SSB associated with a first active TCI state (which is for a first NW node 802), at a second time instant T120 an SSB associated with a second active TCI state (which is for a second NW node 802, 804), and at a third time instant T130 an SSB associated with a third active TCI state (which is for a third NW node). Furthermore, the second SSB burst 746 comprises at a first time instant T110 an SSB associated with a first active TCI state (which is for a first NW node 802), at a second time instant T120 an SSB associated with a second active TCI state (which is for a second NW node 802, 804), and at a third time instant T130 an SSB associated with a third active TCI state (which is for a third NW node). Moreover, the CSI-RS 744 comprises at a first time instant T110 a CSI-RS associated with a first active TCI state (which is for a first NW node 802), at a second time instant T120 a CSI-RS associated with a second active TCI state (which is for a second NW node 802, 804), and at a third time instant T130 a CSI-RS associated with a third active TCI state (which is for a third NW node). In some embodiments, selecting 130 (described above in connection with FIG. 1) a first set 520 of active transceivers is performed with a first periodicity based on (in dependence on, in accordance with) signal strength/quality measurements at time instants associated with the first active TCI state 730, such as at every SSB 742, 746 (e.g., at every SSB associated with the first active TCI state, i.e., at every SSB associated with a first NW node 802, e.g., at T110) and/or at every CSI-RS 744 (e.g., at every (transmission of) CSI-RS associated with the first active TCI state; e.g., at T110), and/or selecting 140 a second set 522, 524 of active transceivers is performed with a second periodicity based on (in dependence on, in accordance with) signal strength/quality measurements at time instants associated with the second active TCI state, such as at every second SSB 746 (e.g., at every second SSB associated with the second active TCI state; i.e., at every second SSB associated with a first or second NW node 802, 804, e.g., at T120) and/or at every second CSI-RS (e.g., at every second CSI-RS associated with the second active TCI state; e.g., at T120).

For supporting handover (HO) the WD may need to find handover (HO) candidate network (NW) nodes to switch to, e.g., if a HO from the serving NW node is needed. Since the serving NW node and a HO candidate NW node may be located in different directions and/or angles, each of the serving NW node and a HO candidate NW node may need a different transceiver set (for satisfactory reception/transmission. Thus, there may be a need for monitoring which set of transceivers is needed for one or more HO candidates in order to perform the HO with low latency and without interruption.

Figure 8:
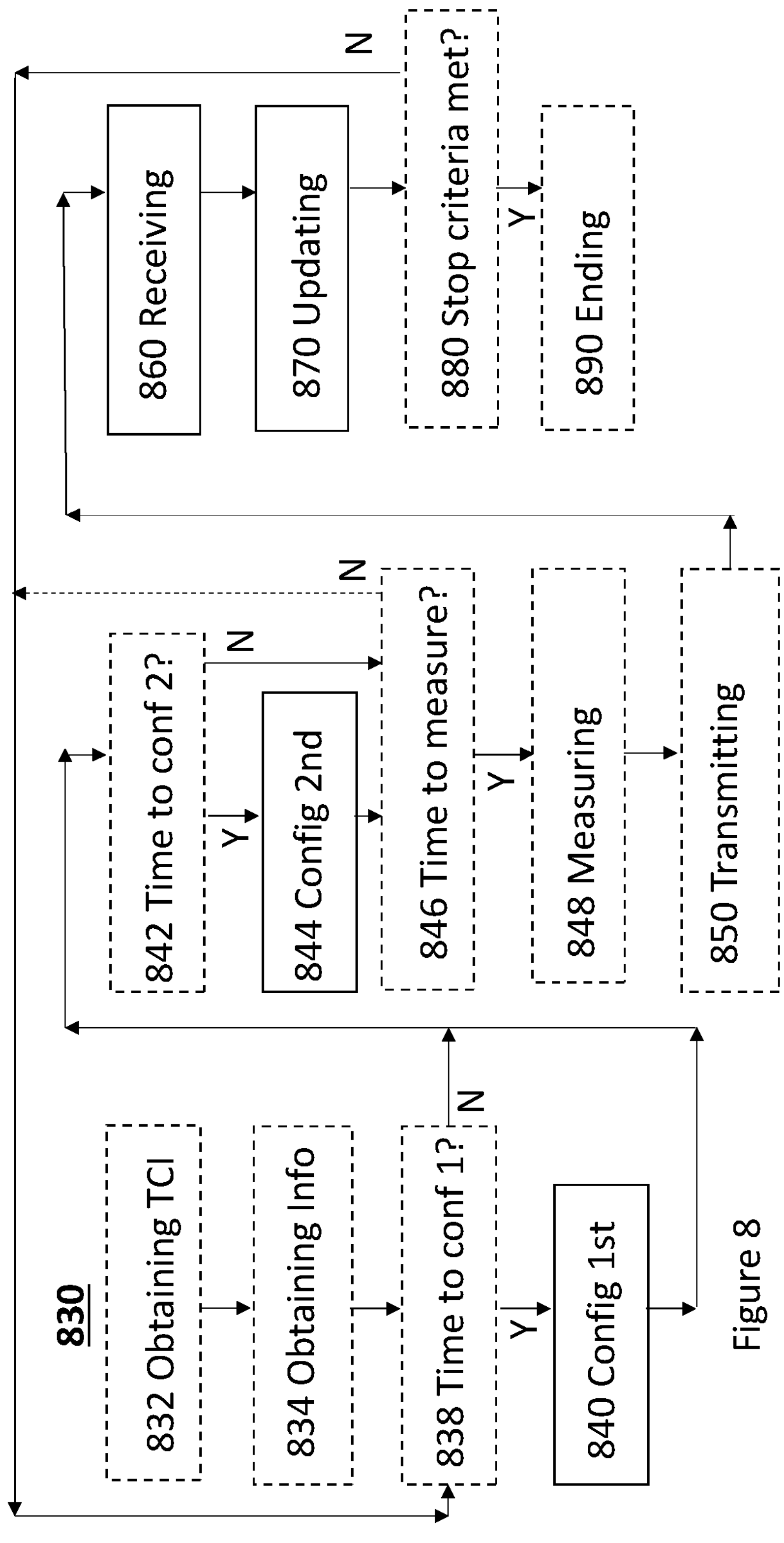
FIG. 8 is a flowchart illustrating method steps according to some embodiments.

FIG. 8 illustrates method steps according to some embodiments. The method 830 is for a processing unit 600 (shown in FIG. 4). The processing unit 600 is comprised or comprisable in a wireless device (WD) 920 (shown in FIG. 4). Furthermore, the processing unit 600 is connected or connectable to a plurality of transceivers 500, . . . , 515 (shown in FIG. 4) directly or via one or more digital interfaces 400, . . . , 415 (shown in FIG. 4). In some embodiments, each transceiver 500, . . . , 515 is connected to one or more antennas 700, . . . , 715 (shown in FIG. 4). In some embodiments, each transceiver comprises first and second transmitter chains, each transmitter chain comprising first and second antennas, the first antenna with vertical polarization and the second antenna with horizontal polarization. Moreover, in some embodiments, the WD 920 comprises the transceivers 500, . . . , 515, the processing unit 600 and optionally the digital interfaces 400, . . . , 415 and/or the one or more antennas 700, . . . , 715. The method 830 comprises configuring 840 a first set 520 of the plurality of transceivers 500, . . . , 515 and/or antennas 700, . . . , 715 to be active. Furthermore, the method comprises configuring 844 a second set 524 of the plurality of transceivers 500, . . . , 515 and/or antennas 700, . . . , 715 to be candidates (e.g., as a set of transceivers and/or antennas for optimal/best reception/transmission from/towards an HO candidate NW node). By configuring a second set 524 of the plurality of transceivers 500, . . . , 515 to be candidates, handover latency may be reduced. In some embodiments, the second set 524 comprises only transceivers not comprised in the first set 520. In some embodiments, configuring 844 comprises configuring 845 (not shown) a third set of the plurality of transceivers 500, . . . , 515 to be dormant, i.e., in a deep sleep mode. Thus, power may be saved. In some embodiments, the third set comprises all transceivers not included in any of the first and second sets 520, 524. Moreover, the method 830 comprises receiving (or obtaining) 860 reconfiguration information, e.g., from a base station, such as a gNB. In some embodiments the reconfiguration information is received/obtained with a regular interval. In some embodiments, the reconfiguration information comprises information about updating a set of active TCI states (for a set 800 of network nodes 802, 804) and/or information associated with at least one deactivated secondary cell, Scell, (in a first or a second cell group, where a first cell group may be Master Cell Group, and a second cell group may be Secondary Cell Group for the case the WD 920 is configured with dual connectivity), a mobility of the WD 920 and/or handover (HO) candidate nodes. In some embodiments, the reconfiguration information indirectly indicates an update of the first and second sets 520, 524 of transceivers. As an example, the reconfiguration information may be a received handover command (e.g., provided via an "RRC reconfiguration" message) which triggers an update of the first and second sets 520, 524 of transceivers, such as a switch of the first and second sets 520, 524, e.g., all the transceivers of the first set 520 are transferred to the second set 524 and all the transceivers of the second set 524 are transferred to the first set 520. The method 830 comprises updating 870 the first and second sets 520, 524 of transceivers based on (in dependence on, in accordance with) the received reconfiguration information. In some embodiments, updating is performed before or in connection with a handover.

In some embodiments, the method 830 comprises obtaining 832 active Transmission Configuration Indicator, TCI, states for a set 800 of network nodes 802, 804, 806. The active TCI states may be obtained from the NW nodes 802, 804, 806 of the set of NW nodes 800. In some embodiments, the method 830 comprises obtaining 834 information associated with at least one deactivated secondary cell (Scell), a mobility of the WD 920 and/or handover (HO) candidate nodes. In some embodiments, the information associated with HO candidate nodes is obtained from synchronization signal blocks (SSB) or beam indices transmitted from the HO candidate nodes. In order to find out in which SSB(s) the information is, the WD 920 may have to look for all indices, e.g., all 64 indices. However, in some embodiments, the WD 920 may receive system information about neighbouring cells on a carrier specifying that the WD 920 only needs to look for certain SSB indices, e.g., the indices numbered 0, 1, 8, 9, . . . , 56, 57. This information then applies to all cells on that carrier. Thus, the risk of errors in detection may be reduced.

In some embodiments, the method 830 comprises checking 838 if it is time for configuring 840 and if it is time for configuring 840, configuring 840 is performed and if it is yet not time for configuring 840, configuring 840 is not performed. Moreover, in some embodiments, the method 830 comprises checking 842 if it is time for configuring 844 and if it is time for configuring 844, configuring 844 is performed and if it is yet not time for configuring 844, configuring 844 is not performed. Furthermore, in some embodiments, configuring 840 the first set 520 of the plurality of transceivers 500, . . . , 515 and/or antennas 700, . . . , 715 to be active is based on (in dependence on, in accordance with) the obtained TCI states. Moreover, in some embodiments, configuring 844 the second set 524 of the plurality of transceivers 500, . . . , 515 and/or antennas 700, . . . , 715 to be candidates is based on (in dependence on, in accordance with) the obtained information associated with the at least one SCell, mobility and/or HO candidate nodes.

In some embodiments, the method 830 comprises checking 846 if it is time to measure signal strength (or signal quality). If it is not yet time to measure signal strength (or signal quality), signal strength (or signal quality) is not measured and the method 830 may wait until it is time to measure signal strength (or signal quality) or the method 830 may continue to receiving 860 or the method 830 may continue to checking 838. Furthermore, in some embodiments, the method 830 comprises measuring 848 signal strength (or signal quality) for each of the first and second sets 520, 524 of transceivers (e.g., if it is time to measure signal strength/quality). In some embodiments, the method 830 comprises transmitting 850 at least one measurement report to a network, NW, node 802, 804. In some embodiments, the network, NW, nodes 802, 804 of the set of NW nodes 800 are remote network nodes. The measurement report comprises measured signal strength/quality (of signals associated with the serving and HO candidate NW nodes 802, 804, 806) for each of the first and second sets 520, 524 of transceivers (e.g., signal strength/quality of the signal from the serving NW node 802 for the first set 520 and signal strength/quality of the signal from the neighbouring/HO candidate NW node 804 for the second set 524). I.e., measurements on the signals from the serving NW node 802 and HO candidate NW nodes 804, 806 are reported in the measurement report. Additionally, or alternatively, the measurement report comprises an event(s) associated with measured signal strength, such as that the signal from a particular HO candidate NW node 804 is stronger than the signal from the serving NW node 802. In some embodiments, the received reconfiguration information is based on (in dependence on, in accordance with) at least one of the transmitted measurement reports, e.g., based on (in dependence on, in accordance with) the measured signal strength (or signal quality) for each of the first and second sets 520, 524 of transceivers in the transmitted measurement report(s).

In some embodiments, configuring 840 the first set 520 of the plurality of transceivers 500, . . . , 515 and/or antennas 700, . . . , 715 to be active is performed with a first periodicity based on (in dependence on, in accordance with) signal strength (or signal quality) measurements at a first time instant associated with the obtained active TCI states, such as at every synchronization signal block, SSB, and/or at every channel state information reference signal, CSI-RS. Furthermore, in some embodiments, configuring 844 the second set 524 of the plurality of transceivers 500, . . . , 515 and/or antennas 700, . . . , 715 to be candidates is performed with a second periodicity based on (in dependence on, in accordance with) signal strength (or signal quality) measurements at a second time instant associated with the mobility state of the WD 920 and/or HO candidate nodes, such as at every or every second SSB and/or at every second CSI-RS. In some embodiments, the first periodicity is equal to or shorter/lower/smaller than the second periodicity. Thus, handover latency may be reduced, while energy efficiency is increased/improved (e.g., if the first periodicity is shorter than the second periodicity).

The signal strength (measurements) may comprise a received power (RP), such as reference signal received power (RSRP), secondary synchronization signal reference signal received power (SS-RSRP), channel state information reference symbols reference signal received power (CSI-RS RSRP) or Layer 1 reference signal received power (L1-RSRP), or a received signal strength indication, such as received signal strength indicator (RSSI). In some embodiments, the signal strength (measurements) comprises SINR, or reference signal received quality (RSRQ) indicative of the relative strength of the signal relative a noise/interference signal strength, or transmitter signal strength indicator (TSSI), and/or is measured based on (in dependence on, in accordance with) PSS/SSS/DMRS, SSB bursts (indices/sets) or CSI-RS time instants.

Preferably the signal strength comprises/is an RSRP. In some embodiments, the measured signal strength is a combined measured signal strength, i.e., the combined value (combined as a sum; or an average/mean/median value) of measured signal strength values for each of the transceivers in the set, e.g., the first set or the second set.

In some embodiments, at least steps 860 and 870 or at least steps 840, 844, 860 and 870 (and optionally the steps 832, 834, 838, 842, 846, 848, and 850) are repeated, e.g., until a stop criterion is reached. Thus, in some embodiments, the method 830 comprises checking 880 if a stop criterion is met (or if any of a number of stop criteria is met). The stop criterion may be any of the above-mentioned stop criteria. Optionally also checking 880 is repeated. Furthermore, in some embodiments, the method 830 comprises ending 890 the method 830 if a stop criterion is met.

Figure 9:
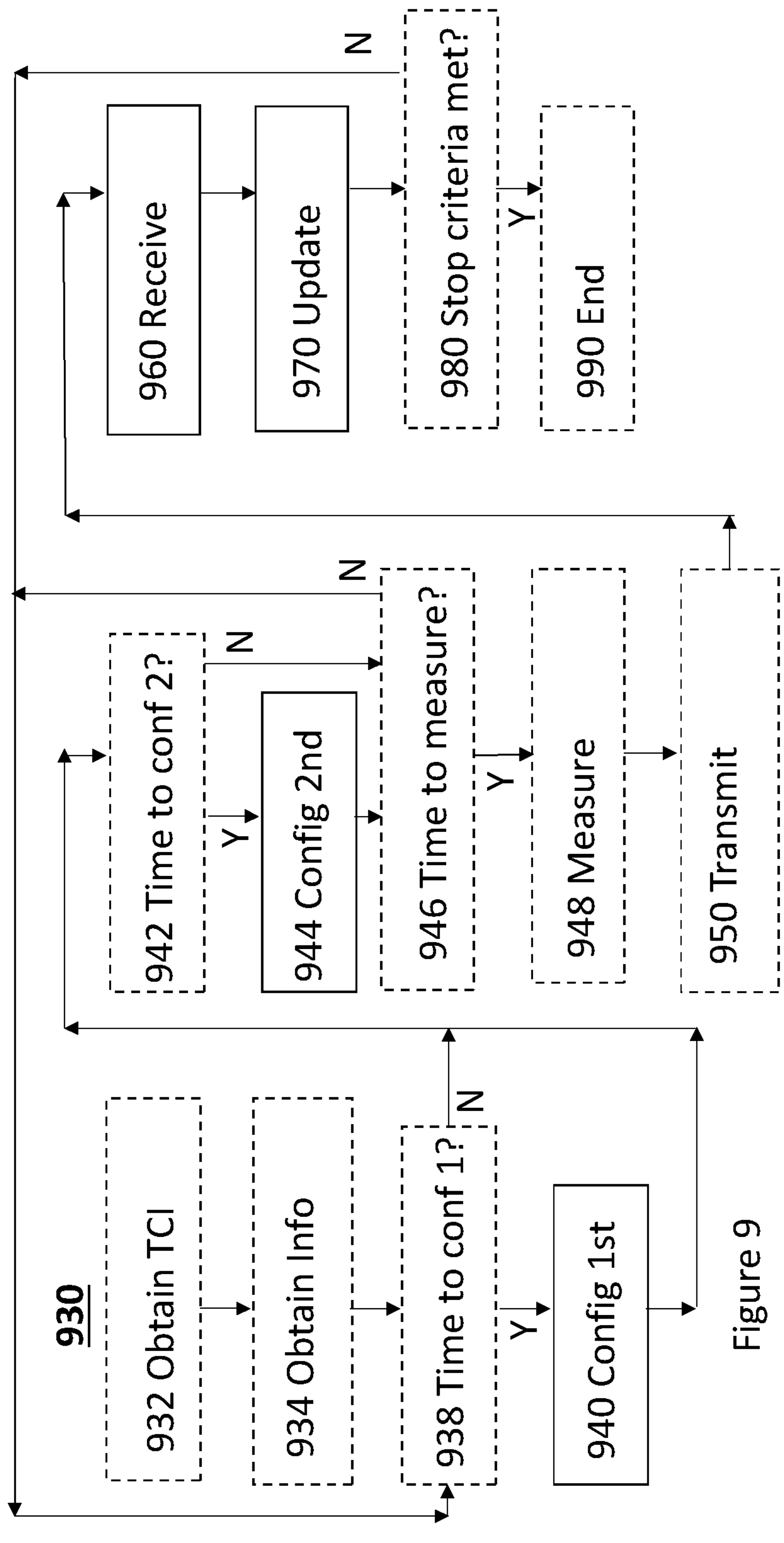
FIG. 9 is a flowchart illustrating actions/method steps implemented in a processing unit according to some embodiments.

FIG. 9 illustrates actions/method steps 930 implemented in a processing unit 600 (or in control circuitry thereof/comprised therein) according to some embodiments. The processing unit 600 is comprised or comprisable in a wireless device (WD) 920 (shown in FIG. 4). Furthermore, the processing unit 600 is connected or connectable to a plurality of transceivers 500, . . . , 515 (shown in FIG. 4) directly or via one or more digital interfaces 400, . . . , 415 (shown in FIG. 4). In some embodiments, each transceiver 500, . . . , 515 is connected to one or more antennas 700, . . . , 715 (shown in FIG. 4). Moreover, in some embodiments, the WD 920 comprises the transceivers 500, . . . , 515, the processing unit 600 and optionally the digital interfaces 400, . . . , 415 and/or the one or more antennas 700, . . . , 715. The processing unit 600 is configured to configure 940 a first set 520 of the plurality of transceivers 500, . . . , 515 and/or antennas 700, . . . , 715 to be active. To this end, the processing unit 600 may be associated with (e.g., operatively connectable, or connected, to) a third configuration unit (e.g., third configuring circuitry or a third configurer). Furthermore, the processing unit 600 is configured to configure 944 a second set 524 of the plurality of transceivers 500, . . . , 515 and/or antennas 700, . . . , 715 to be candidates. To this end, the processing unit 600 may be associated with (e.g., operatively connectable, or connected, to) a fourth configuration unit (e.g., fourth configuring circuitry or a fourth configurer). In some embodiments, configure 944 comprises configure 945 a third set of the plurality of transceivers 500, . . . , 515 to be dormant, i.e., to be in a deep sleep mode. In some embodiments, the third set comprises all transceivers not included in any of the first and second sets 520, 524. Moreover, the processing unit 600 is configured to receive 960 reconfiguration information, e.g., from a base station, such as a gNB. To this end, the processing unit 600 may be associated with (e.g., operatively connectable, or connected, to) a receiving unit (e.g., receiving circuitry or a receiver). The processing unit 600 is configured to update 970 the first and second sets 520, 524 of transceivers based on (in dependence on, in accordance with) the received reconfiguration information. To this end, the processing unit 600 may be associated with (e.g., operatively connectable, or connected, to) an updating unit (e.g., updating circuitry or an updater).

In some embodiments, the processing unit 600 is configured to obtain 932 active Transmission Configuration Indicator, TCI, states for a set 800 of network nodes 802, 804. To this end, the processing unit 600 may be associated with (e.g., operatively connectable, or connected, to) a third obtainment unit (e.g., third obtainment circuitry or a third obtainer). Furthermore, in some embodiments, the processing unit 600 is configured to obtain 934 information associated with at least one deactivated secondary cell (Scell), a mobility of the WD 920 and/or HO candidate nodes. To this end, the processing unit 600 may be associated with (e.g., operatively connectable, or connected, to) a fourth obtainment unit (e.g., fourth obtainment circuitry or a fourth obtainer). Moreover, in some embodiments, the processing unit 600 is configured to check 838 if it is time to configure 940 the first set and if it is time to configure 940, configure 940 is performed and if it is yet not time to configure 940, configure 940 is not performed. To this end, the processing unit 600 may be associated with (e.g., operatively connectable, or connected, to) a first checking unit (e.g., first checking circuitry or a first checker). Moreover, in some embodiments, the processing unit 600 is configured to check 942 if it is time to configure 944 the second set 524 and if it is time to configure 944 the second set 524, configure 944 is performed and if it is yet not time to configure 944, configure 944 is not performed. To this end, the processing unit 600 may be associated with (e.g., operatively connectable, or connected, to) a second checking unit (e.g., second checking circuitry or a second checker). In some embodiments, the processing unit 600 is configured to check 946 if it is time to measure signal strength (or signal quality). If it is not yet time to measure signal strength (or signal quality), signal strength (or signal quality) is not measured and the processing unit 600 may wait until it is time to measure signal strength (or signal quality) or the processing unit 600 may continue to receive 960 or to check 938. To this end, the processing unit 600 may be associated with (e.g., operatively connectable, or connected, to) a third checking unit (e.g., third checking circuitry or a third checker). Furthermore, in some embodiments, the processing unit 600 is configured to measure 948 signal strength (or signal quality) for each of the first and second sets 520, 524 of transceivers (e.g., if it is time to measure signal strength). To this end, the processing unit 600 may be associated with (e.g., operatively connectable, or connected, to) a measurement unit (e.g., measuring circuitry or a measurer). Moreover, in some embodiments, the processing unit 600 is configured to transmit 950 at least one measurement report to a network, NW, node 802, 804. In some embodiments, the network, NW, nodes 802, 804 of the set of NW nodes 800 are remote network nodes. To this end, the processing unit 600 may be associated with (e.g., operatively connectable, or connected, to) a sending unit (e.g., sending circuitry or a sender or one or more transceivers 500, . . . , 515). In some embodiments, at least the steps 960 and 970 or at least the steps 940, 944, 960 and 970 (and optionally the steps 932, 934, 938, 942, 946, 948, and 950) are repeated, e.g., until a stop criterion is reached. Thus, in some embodiments, the processing unit 600 is configured to check 980 if a stop criterion is met (or if any of a number of stop criteria is met). The stop criterion may be any of the above mentioned stop criteria. Optionally also the check 980 is repeated. To this end, the processing unit 600 may be associated with (e.g., operatively connectable, or connected, to) a fourth checking unit (e.g., fourth checking circuitry or a fourth checker). Furthermore, in some embodiments, the processing unit 600 is configured to end 990 the procedure if a stop criterion is met. To this end, the processing unit 600 may be associated with (e.g., operatively connectable, or connected, to) an end unit (e.g., ending circuitry or an ender).

Returning to FIGS. 7A-7B, in some embodiments, some or all of the actions/method steps 930 are implemented in the processing unit 600. The processing unit 600 is configured to obtain 932 active Transmission Configuration Indicator, TCI, states 730, 740, 750 for a set 800 of network nodes 802, 804. Furthermore, the processing unit 600 is configured to obtain 934 information associated with at least one deactivated secondary cell (SCell), a mobility of the WD 920 and/or HO candidate nodes. Moreover, configuration 940 of the first set 520 of the plurality of transceivers 500, . . . , 515 and/or antennas 700, . . . , 715 to be active is based on (in dependence on, in accordance with) the obtained TCI states 730, 740. Configuration 944 of the second set 524 of the plurality of transceivers 500, . . . , 515 and/or antennas 700, . . . , 715 to be candidates is based on (in dependence on, in accordance with) the obtained information 750 associated with the at least one SCell, mobility and/or HO candidate nodes. The second set 524 of the plurality of transceivers 500, . . . , 515 and/or antennas 700, . . . , 715 may also be referred to as a Virtual Active Transceiver/Antenna Set. In some embodiments, configuration 940 of the first set 520 of the plurality of transceivers 500, . . . , 515 and/or antennas 700, . . . , 715 to be active is performed with a first periodicity based on (in dependence on, in accordance with) signal strength (or signal quality) measurements at a first time instant associated with the obtained active TCI states, such as at every SSB 742, 746 and/or at every CSI-RS 744. Furthermore, in some embodiments, configuration 944 of the second set 524 of the plurality of transceivers 500, . . . , 515 and/or antennas 700, . . . , 715 to be candidates is performed with a second periodicity based on (in dependence on, in accordance with) signal strength (or signal quality) measurements at a second time instant associated with the mobility state of the WD 920 and/or HO candidate nodes, such as at every or every second SSB 742, 746 and/or at every second CSI-RS 744.

In the present invention a candidate set is kept at all times and only updated e.g., at handover (HO), such as at single active protocol stack HO (SAPS-HO). Thus, latency is reduced, e.g., while reducing complexity. Thus, by configuring a second set 524 of the plurality of transceivers 500, . . . , 515 to be candidates (in advance of e.g., an HO or for mobility), latency may be reduced. I.e., by configuring and keeping a candidate set (e.g., for HO or for mobility) at all times as opposed to configuring the set at the time of HO, latency is reduced.

LIST OF EXAMPLES

1. A method (100) for a processing unit (600), the processing unit (600) being comprisable in a wireless device, WD, (920) and being connectable to a plurality of transceivers (500, . . . , 515), the method comprising:
   - obtaining (110) a first active Transmission Configuration Indicator, TCI, state for a first network, NW, node (802);
   - obtaining (120) a second active TCI state for a second NW, node (802, 804);
   - selecting (130) a first set (520) of active transceivers from the plurality of transceivers (500, . . . , 515) based on the first active TCI state;
   - selecting (140) a second set (522, 524) of active transceivers from the plurality of transceivers (500, . . . , 515) based on the second active TCI state;
   - configuring (150) the first set (520) of active transceivers to receive, at a first time instant, a first physical channel/signal transmitted according to the first active TCI state; and
   - configuring (160) the second set (522, 524) of active transceivers to receive, at a second time instant, a second physical channel/signal transmitted according to the second active TCI state.

2. The method of example 1, wherein the second active TCI state is obtained based on information received via the first physical channel.

3. The method of any of examples 1-2, wherein the first physical channel is a physical downlink control channel, PDCCH, and the second physical channel is a physical downlink shared channel, PDSCH, or wherein the first and second physical channels are PDCCH or wherein the first and second physical channels are PDSCH or wherein one or both of the physical signals are downlink reference signals, such as channel state information reference signals, CSI-RS or wherein the first physical channels is a PDCCH and the second physical signal is a CSI-RS.

4. The method of any of examples 1-3, wherein configuring (150) the first set (520) of active transceivers comprises activating (152) the first set (520) of active transceivers and/or wherein configuring (160) the second set (522, 524) of active transceivers comprises activating (162) the second set (522, 524) of active transceivers.

5. The method of any of examples 1-4, wherein the first and second active TCI states are different, wherein the first set (520) of active transceivers comprises at least one transceiver not comprised in the second set (522, 524) of active transceivers and/or wherein the second set (522, 524) of active transceivers comprises at least one transceiver (501, 506, 508, 509, 510, 511) not comprised in the first set (520) of active transceivers.

6. The method of any of examples 1-5, wherein selecting (130) a first set (520) of active transceivers is performed with a first periodicity based on signal strength measurements at time instants associated with the first active TCI state, such as at every transmission of a synchronization signal block, SSB, associated with the first active TCI state and/or at every transmission of a CSI-RS associated with the first active TCI state, and/or wherein selecting (140) a second set (522, 524) of active transceivers is performed with a second periodicity based on signal strength measurements at time instants associated with the second active TCI state, such as at every second transmission of an SSB associated with the second active TCI state and/or at every second transmission of a CSI-RS associated with the second active TCI state.

7. The method of any of examples 1-6, wherein the first set (520) of active transceivers is set as a main active set at the first time instant, wherein the second set (522, 524) of active transceivers is set as the main active set at the second time instant, wherein the transceivers (502, 503, 504, 505) of the first set (520) of active transceivers are set to a first sleep mode when the first set (520) of active transceivers is no longer the main active set, wherein the transceivers (501, 502, 503, 504, 505, 506, 508, 509, 510, 511) of the second set (522, 524) of active transceivers are set to a first sleep mode when the second set (522, 524) of active transceivers is no longer the main active set, wherein all transceivers not comprised in any of the first and second sets (520, 522, 524) of active transceivers are set to a second sleep mode, and wherein the transceivers in the second sleep mode requires less power than the transceivers in the first sleep mode.

8. A computer program product comprising a non-transitory computer readable medium (200), having stored thereon a computer program comprising program instructions, the computer program being loadable into a data processing unit (220) and configured to cause execution of the method of any of examples 1-7 when the computer program is run by the data processing unit.

9. A processing unit (600), the processing unit (600) being comprisable in a wireless device, WD, (920) and being connectable to a plurality of transceivers (500, . . . , 515), the processing unit (600) being configured to:
   - obtain (310) a first active Transmission Configuration Indicator, TCI, state for a first network, NW, node (802);
   - obtain (320) a second active TCI state for a second NW, node (802, 804);
   - select (330) a first set (520) of active transceivers from the plurality of transceivers (500, . . . , 515) based on the first active TCI state;
   - select (340) a second set (522, 524) of active transceivers from the plurality of transceivers (500, . . . , 515) based on the second active TCI state;
   - configure (350) the first set (520) of active transceivers to receive, at a first time instant, a first physical channel/signal transmitted according to the first active TCI state; and
   - configure (360) the second set (522, 524) of active transceivers to receive, at a second time instant, a second physical channel/signal transmitted according to the second active TCI state.

10. The processing unit of example 9, wherein the first and second physical channels are the same physical channel and/or wherein the second time instant is different from the first time instant, the second time instant preferably occurring after the first time instant.

11. A wireless device, WD, (920*a*) comprising:
   - a plurality of transceivers (500, . . . , 515), each transceiver (500, . . . , 515) comprising an antenna (700), a low noise amplifier, LNA, (580), a mixer (582), a variable gain amplifier, VGA (584), an analog to digital converter, ADC, (586) and one or more filters (588); and a baseband processor (910), comprising the processing unit (600) of any of examples 9-10; and wherein each transceiver (500, . . . , 515) is connected to the baseband processor (910).

12. A wireless device, WD, (920*b*) comprising:

a plurality of transceivers (500, . . . , 515), each transceiver (500, . . . , 515) comprising an antenna (700), a low noise amplifier, LNA, (580), a mixer (582), and a variable gain amplifier, VGA (584);

one or more digital interfaces (400, . . . , 415), each digital interface (400, . . . , 415) comprising an analog to digital converter, ADC, (486) and one or more filters (488), each digital interface (400, . . . , 415) being connected to one or more of the plurality of transceivers (500, . . . , 515); and a baseband processor (910), comprising the processing unit (600) of any of examples 9-10; and wherein each digital interface (400, . . . , 415) is connected to the baseband processor (910).

13. A wireless device, WD, (920*c*) comprising:

a plurality of transceivers (500, . . . , 515), each transceiver (500, . . . , 515) comprising an antenna (700), a low noise amplifier, LNA, (580), and a mixer (582);

one or more digital interfaces (400, . . . , 415), each digital interface (400, . . . , 415) comprising a variable gain amplifier, VGA (484), an analog to digital converter, ADC, (486) and one or more filters (488), each digital interface (400, . . . , 415) being connected to one or more of the plurality of transceivers (500, . . . , 515); and a baseband processor (910), comprising the processing unit (600) of any of examples 9-10; and wherein each digital interface (400, . . . , 415) is connected to the baseband processor (910).

Generally, all terms used herein are to be interpreted according to their ordinary meaning in the relevant technical field, unless a different meaning is clearly given and/or is implied from the context in which it is used. Reference has been made herein to various embodiments. However, a person skilled in the art would recognize numerous variations to the described embodiments that would still fall within the scope of the claims. For example, the method embodiments described herein discloses example methods through steps being performed in a certain order. However, it is recognized that these sequences of events may take place in another order without departing from the scope of the claims. Furthermore, some actions/method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step. In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer e.g., a single) unit. Any feature of any of the embodiments/aspects disclosed herein may be applied to any other embodiment/aspect, wherever suitable. Likewise, any advantage of any of the embodiments may apply to any other embodiments, and vice versa. Hence, it should be understood that the details of the described embodiments are merely examples brought forward for illustrative purposes, and that all variations that fall within the scope of the claims are intended to be embraced therein.

The invention claimed is:

1. A method for a processing unit, the processing unit being comprisable in a wireless device, WD, and being connectable to a plurality of transceivers, the method comprising:

obtaining a first active Transmission Configuration Indicator (TCI) state for a first network (NW) node;

obtaining a second active TCI state for a second NW node;

selecting a first set of active transceivers from the plurality of transceivers based on the first active TCI state;

selecting a second set of active transceivers from the plurality of transceivers based on the second active TCI state;

configuring the first set of active transceivers to receive, at a first time instant, a first physical channel transmitted according to the first active TCI state; and configuring the second set of active transceivers to receive, at a second time instant, a second physical channel/signal transmitted according to the second active TCI state, wherein the second active TCI state is obtained based on information received via the first physical channel.

2. The method of claim 1, wherein the first physical channel is a physical downlink control channel (PDCCH) and the second physical channel is a physical downlink shared channel (PDSCH).

3. The method of claim 1, wherein the first and second physical channels are physical downlink control channels (PDCCHs) or physical downlink shared channels (PDSCHs).

4. The method of claim 1, wherein the second physical signal is a downlink reference signal or a channel state information reference signal (CSI-RS).

5. The method of claim 1, wherein configuring the first set of active transceivers comprises activating the first set of active transceivers.

6. The method of claim 1, wherein configuring the second set of active transceivers comprises activating the second set of active transceivers.

7. The method of claim 1, wherein the first and second active TCI states are different.

8. The method of claim 1, wherein the first set of active transceivers comprises at least one transceiver not comprised in the second set of active transceivers.

9. The method of claim 1, wherein the second set of active transceivers comprises at least one transceiver not comprised in the first set of active transceivers.

10. The method of claim 1, wherein the second set of active transceivers is different from the first set of active transceivers.

11. The method of claim 1, wherein selecting a first set of active transceivers is performed with a first periodicity based on signal strength measurements at time instants associated with the first active TCI state.

12. The method of claim 11, wherein selecting a first set of active transceivers is performed at every transmission of a synchronization signal block (SSB) associated with the first active TCI state and/or at every transmission of a CSI-RS associated with the first active TCI state.

13. The method of claim 1, wherein selecting a second set of active transceivers is performed with a second periodicity based on signal strength measurements at time instants associated with the second active TCI state.

14. The method of claim 13, wherein selecting second set of active transceivers is performed at every second transmission of a synchronization signal block (SSB) associated with the second active TCI state and/or at every second transmission of a channel state information reference signal (CSI-RS) associated with the second active TCI state.

15. The method of claim 1, wherein the second NW node is different from the first NW node.

16. The method of claim 1, wherein the first set of active transceivers is set as a main active set at the first time instant, wherein the second set of active transceivers is set as the main active set at the second time instant, wherein the transceivers of the first set of active transceivers are set to a first sleep mode when the first set of active transceivers is no longer the main active set, wherein the transceivers of the second set of active transceivers are set to a first sleep mode when the second set of active transceivers is no longer the main active set, wherein all transceivers not comprised in any of the first and second sets of active transceivers are set to a second sleep mode, and wherein the transceivers in the second sleep mode requires less power than the transceivers in the first sleep mode.

17. A non-transitory computer-readable storage medium storing one or more programs configured to be executed by one or more processors of a processing device, the one or more programs comprising instructions which, when executed by the processing device, causes the processing device to carry out the method according to claim 1.

18. A processing unit, the processing unit being comprisable in a wireless device (WD) and being connectable to a plurality of transceivers, the processing unit being configured to:

obtain a first active Transmission Configuration Indicator (TCI) state for a first network (NW) node;

obtain a second active TCI state for a second NW node based on information received via a first physical channel;

select a first set of active transceivers from the plurality of transceivers based on the first active TCI state;

select a second set of active transceivers from the plurality of transceivers based on the second active TCI state;

configure the first set of active transceivers to receive, at a first time instant, the first physical channel transmitted according to the first active TCI state; and configure the second set of active transceivers to receive, at a second time instant, a second physical channel/signal transmitted according to the second active TCI state.

19. The processing unit of claim 18, wherein the first and second physical channels are the same physical channel.

20. The processing unit of claim 18, wherein the second time instant is different from the first time instant and wherein the second time instant occurs after the first time instant.

* * * * *